(12) United States Patent
Jeon et al.

(10) Patent No.: US 11,960,367 B2
(45) Date of Patent: Apr. 16, 2024

(54) PERIPHERAL COMPONENT INTERCONNECT EXPRESS DEVICE AND OPERATING METHOD THEREOF

(71) Applicant: SK hynix Inc., Icheon-si (KR)

(72) Inventors: Yong Tae Jeon, Icheon-si (KR); Dae Sik Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 127 days.

(21) Appl. No.: 17/751,463

(22) Filed: May 23, 2022

(65) Prior Publication Data
US 2022/0374319 A1 Nov. 24, 2022

(30) Foreign Application Priority Data

May 24, 2021 (KR) .......................... 10-2021-0066435
May 25, 2021 (KR) .......................... 10-2021-0067203

(51) Int. Cl.
*G06F 11/20* (2006.01)
*G06F 13/42* (2006.01)

(52) U.S. Cl.
CPC ...... *G06F 11/2005* (2013.01); *G06F 13/4221* (2013.01); *G06F 2201/85* (2013.01); *G06F 2213/0026* (2013.01)

(58) Field of Classification Search
CPC .......................... G06F 11/2005; G06F 13/4221
See application file for complete search history.

(56) References Cited

U.S. PATENT DOCUMENTS

| 8,645,746 B2 | 2/2014 | Buckland et al. |
| 8,654,746 B2 | 2/2014 | Cordeiro et al. |
| 8,848,826 B2 | 9/2014 | Lin et al. |
| 9,124,455 B1* | 9/2015 | Lim ................. H04L 25/03343 |
| 9,424,226 B1 | 8/2016 | Weimer |
| 9,645,965 B2 | 5/2017 | Das Sharma et al. |
| 10,469,291 B2 | 11/2019 | Berke et al. |
| 11,467,909 B1 | 10/2022 | Jeon et al. |
| 2009/0219978 A1* | 9/2009 | Mobin ............. H04L 25/03006 375/219 |

(Continued)

FOREIGN PATENT DOCUMENTS

| CN | 107066417 A | 8/2017 |
| CN | 112269752 A | 1/2021 |

(Continued)

OTHER PUBLICATIONS

Rangel-Patino, F., Rayas-Sanchez, J., Vega-Ochoa, E., & Hakim, N. (2018). Direct optimization of a PCI express link equalization in industrial post-silicon validation doi:http://dx.doi.org/10.1109/LATW.2018.8347238 (Year: 2018).

(Continued)

*Primary Examiner* — Jigar P Patel

(57) ABSTRACT

A Peripheral Component Interconnect Express (PCIe) device includes a plurality of lanes comprising a plurality of ports, a link controller setting a link including the plurality of lanes, wherein the link is set to have a link width that includes the remaining of lanes, except for a fail lane from among the plurality of lanes, and an EQ controller performing an equalization operation for determining a transmitter or receiver setting of each of the remaining lanes, wherein the EQ controller determining a final EQ coefficient using a log information and an error information.

20 Claims, 21 Drawing Sheets

(56) References Cited

U.S. PATENT DOCUMENTS

| | | |
|---|---|---|
| 2013/0089122 A1 | 4/2013 | Lin et al. |
| 2015/0324268 A1 | 11/2015 | Du |
| 2016/0170918 A1 | 6/2016 | Butcher |
| 2017/0063449 A1 | 3/2017 | Dreps |
| 2017/0346596 A1 | 11/2017 | Desimone |
| 2018/0095920 A1 | 4/2018 | Kwak |
| 2018/0181502 A1 | 6/2018 | Jen |
| 2020/0192850 A1 | 6/2020 | Caruk |
| 2020/0250368 A1 | 8/2020 | Froelich et al. |
| 2020/0371579 A1 | 11/2020 | Selvam et al. |
| 2021/0119835 A1 | 4/2021 | Levin |
| 2022/0163588 A1 | 5/2022 | Froelich |

FOREIGN PATENT DOCUMENTS

| | | | |
|---|---|---|---|
| JP | 2013065079 A | | 4/2013 |
| KR | 10-2014-0113592 A | | 9/2014 |
| KR | 10-2018-0037783 A | | 4/2018 |
| KR | 10-2016-0077147 A | | 7/2018 |

OTHER PUBLICATIONS

Ruiz-Urbina, R., Rangel-Patino, F., Rayas-Sanchez, J., Vega-Ochoa, E., & Longoria-Gandara, 0. (2021). Transmitter and receiver equalizers optimization for PCI express Gen6.0 based on PAM4 doi:http://dx.doi.org/10.1109/LAMC50424.2021.9601893 (Year: 2021).

Notice of Allowance issued for U.S. Appl. No. 17/506,953 dated Jun. 29, 2022.

TDR Impedence Measurements A Foundation for Signal Integrity; Date: 2008; Website: www.tektronix.com/oscilloscopes.

Non-Final Rejection of U.S. Appl. No. 17/506,889 from the USPTO dated Nov. 15, 2022.

EPO machine translation of JP-2013-065079A (Year: 2013).

\* cited by examiner

FIG. 17

| C-1 \ C+1 | 0 | 1 | 2 | 3 | 4 | 5 | 6 | 7 | 8 | 9 | 10 | 11 |
|---|---|---|---|---|---|---|---|---|---|---|---|---|
| 0 | CO: 32<br>Error: | CO: 31<br>Error: | CO: 30<br>Error: | CO: 29<br>Error: | CO: 28<br>Error: | CO: 27<br>Error: | CO: 26<br>Error: | CO: 25<br>Error: | CO: 24<br>Error: | CO: 23<br>Error: | CO: 22<br>Error: | CO: 21<br>Error: |
| 1 | CO: 31<br>Error: | CO: 30<br>Error: | CO: 29<br>Error: | CO: 28<br>Error: | CO: 27<br>Error: | CO: 26<br>Error: | CO: 25<br>Error: | CO: 24<br>Error: | CO: 23<br>Error: | CO: 22<br>Error: | CO: 21<br>Error: | |
| 2 | CO: 30<br>Error: | CO: 29<br>Error: | CO: 28<br>Error: | CO: 27<br>Error: | CO: 26<br>Error: | CO: 25<br>Error: | CO: 24<br>Error: | CO: 23<br>Error: | CO: 22<br>Error: | CO: 21<br>Error: | | |
| 3 | CO: 29<br>Error: | CO: 28<br>Error: | CO: 27<br>Error: | CO: 26<br>Error: | CO: 25<br>Error: | CO: 24<br>Error: | CO: 23<br>Error: | CO: 22<br>Error: | CO: 21<br>Error: | | | |
| 4 | CO: 28<br>Error: | CO: 27<br>Error: | CO: 26<br>Error: | CO: 25<br>Error: | CO: 24<br>Error: | CO: 23<br>Error: | CO: 22<br>Error: | CO: 21<br>Error: | | | | |
| 5 | CO: 27<br>Error: | CO: 26<br>Error: | CO: 25<br>Error: | CO: 24<br>Error: | CO: 23<br>Error: | CO: 22<br>Error: | CO: 21<br>Error: | | | | | |
| 6 | CO: 26<br>Error: | CO: 25<br>Error: | CO: 24<br>Error: | CO: 23<br>Error: | CO: 22<br>Error: | CO: 21<br>Error: | | | | | | |
| 7 | CO: 25<br>Error: | CO: 24<br>Error: | CO: 23<br>Error: | CO: 22<br>Error: | CO: 21<br>Error: | | | | | | | |
| 8 | CO: 24<br>Error: | CO: 23<br>Error: | CO: 22<br>Error: | CO: 21<br>Error: | | | | | | | | |

PERIPHERAL COMPONENT INTERCONNECT EXPRESS DEVICE AND OPERATING METHOD THEREOF

CROSS-REFERENCE TO RELATED APPLICATION

The present application claims priority under 35 U.S.C. § 119(a) to Korean patent application number 10-2021-0066435, filed on May 24, 2021, and Korean patent application number 10-2021-0067203, filed on May 25, 2021, which are incorporated herein by reference in its entirety.

BACKGROUND

1. Technical Field

Various embodiments generally relate to an electronic device, and more particularly, to a Peripheral Component Interconnect Express (PCIe) device and an operating method thereof.

2. Related Art

Peripheral Component Interconnect Express (PCIe) refers to an interface with a serial configuration for data communication. A PCIe-based storage device may support multi-port and multi-function. A PCIe-based storage device may be virtualized or non-virtualized and achieve Quality of Service (QoS) of host I/O commands through at least one PCIe function.

A storage device may store data under the control of a host device such as a computer or a smart phone. A storage device may include a memory device storing data and a memory controller controlling the memory device. Memory devices may be divided into volatile memory devices and non-volatile memory devices.

A volatile memory device may retain data as long as power is being supplied, and may lose stored data in the absence of power supply. Types of volatile memory devices may include Static Random Access Memory (SRAM), Dynamic Random Access Memory (DRAM), and the like.

A non-volatile memory device does not lose data even in the absence of power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

SUMMARY

Various embodiments of the present disclosure are directed to a PCIe device in which a fail lane is detected during a link setting operation, the PCIe device establishes a link using remaining lanes, and the PCIe device performs an improved PCIe equalization operation and an operating method thereof.

According to an embodiment, A Peripheral Component Interconnect Express (PCIe) device may include a plurality of lanes comprising a plurality of ports, a link controller setting a link including the plurality of lanes, wherein the link is set to have a link width that includes remaining lanes, except for a fail lane from among the plurality of lanes, an EQ controller performing an equalization operation for determining a transmitter or receiver setting of each of the remaining lanes and an EQ information storage storing log information indicating a number of equalization operation attempts with respect to each of a plurality of EQ coefficients and storing error information about an error occurring in an L0 state with respect to each of the plurality of EQ coefficients, which includes a transmitter coefficient or a receiver coefficient, wherein the EQ controller determines a final EQ coefficient using the log information and the error information.

According to an embodiment, a Peripheral Component Interconnect Express (PCIe) device coupled to an external device through a link including a plurality of lanes may include an EQ controller controlling the PCIe device to perform an equalization operation for determining a transmitter or receiver setting of each of the plurality of lanes, and an EQ information storage storing log information indicating a number equalization operation attempts with respect to each of a plurality of EQ coefficients and storing error information about an error occurring in an L0 state with respect to each of the plurality of EQ coefficients, which includes a transmitter coefficient or a receiver coefficient, wherein the EQ controller determines a final EQ coefficient using the log information and the error information.

According to an embodiment, a method of operating a PCIe device coupled to an external device through a link including a plurality of lanes may include determining whether a log information that indicates a number of times an equalization operation is tested on the plurality of lanes with respect to each of a plurality of EQ coefficients, determining an EQ coefficient to test the equalization operation using the log information when the log information exists, performing a link up according to the determined EQ coefficient, and storing log information corresponding to the determined EQ coefficient and an error information about an error occurring in a link up state.

According to an embodiment, a PCIe device may include a plurality of lanes comprising a plurality of ports, and a link controller setting a link including the plurality of lanes, wherein the link is set to have a link width that includes the plurality of lanes, except for a fail lane from among the plurality of lanes, wherein the fail lane from among the plurality of lanes has a state in which the fail lane is unable to form a link with remaining lanes that have not failed from among the plurality of lanes.

According to an embodiment, a computing system may include a first PCIe device including a plurality of downstream ports, a second PCIe device including a plurality of upstream ports, and a link including a plurality of lanes comprising the plurality of downstream ports and the plurality of downstream ports and transmitting and receiving data to from the first PCIe device, wherein the first PCIe device sets the link to have a link width including remaining lanes but not a fail lane from among the plurality of lanes, and wherein the fail lane has a state in which the fail lane is unable to form the link with the remaining lanes.

BRIEF DESCRIPTION OF THE DRAWINGS

FIG. 17 is a diagram illustrating an EQ coefficient table according to an embodiment of the present disclosure.

DETAILED DESCRIPTION

Figure 1:
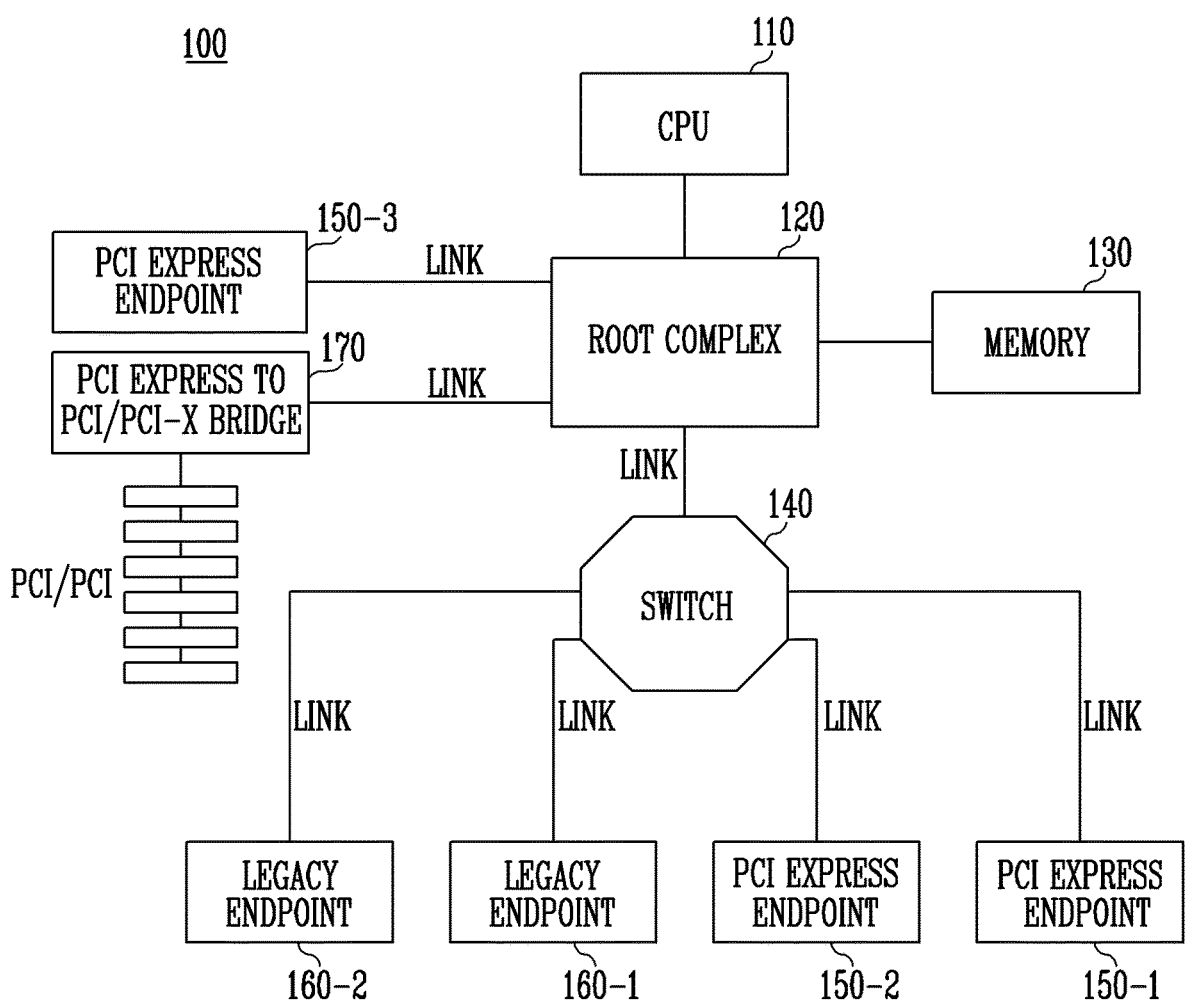
FIG. 1 is a diagram illustrating a PCIe computing system according to an embodiment of the present disclosure.

Specific structural or functional descriptions of examples of embodiments in accordance with concepts that are disclosed in this specification are illustrated only to describe the examples of embodiments in accordance with the concepts. Examples of embodiments in accordance with the concepts may be carried out in various forms. However, the descriptions are not limited to the examples of embodiments described in this specification.

Various modifications and changes may be applied to the examples of embodiments in accordance with the concepts so that the examples of embodiments will be illustrated in the drawings and described in the specification. However, the embodiments according to the concept of the present disclosure are not construed as limited to specified disclosures, and include all changes, equivalents, or substitutes that do not depart from the spirit and technical scope of the present disclosure. In describing those embodiments, description will be omitted for techniques that are well known to the art to which the present disclosure pertains, and are not directly related to the present disclosure. This intends to disclose the gist of the present disclosure more clearly by omitting unnecessary description.

Hereinafter, exemplary embodiments of the present disclosure will be described in detail with reference to the accompanying drawings.

FIG. 1 is a diagram illustrating a PCIe computing system according to an embodiment of the present disclosure.

Referring to FIG. 1, a PCIe computing system 100 may include a central processing unit (CPU) 110, a root complex 120, a memory 130, a switch 140, PCIe endpoints 150_1 to 150_3, legacy endpoints 160_1 and 160_2, and a PCIe to PCI/PCI-X bridge 170.

The PCIe computing system 100 may be an electronic device that supports communication using a PCIe interface. The PCIe computing system 100 may be a personal computer (PC), a laptop computer, or a mobile computing device. The PCIe computing system 100 may include an expansion card, an expansion board, an adapter card, an add-in card, or an accessory card. In addition, the PCIe computing system 100 may include a printed circuit board (PCB) that is inserted into an electrical connector or an expansion slot on a mother board of the PCIe computing system 100 to provide additional functions to the PCIe computing system 100 through an expansion bus. In addition, the PCIe computing system 100 may include a storage device, such as solid state drive (SSD), and may include a graphic card, a network card, or a USB card.

The CPU 110 may be electrically coupled to each of the components of the PCIe computing system 100 and may control respective operations of the PCIe computing system 100. More specifically, the CPU 110 may drive an operating system or an application program to control components of hardware or software coupled to the CPU 110 and may perform various types of data processing and operations. In addition, the CPU 110 may perform software or applications for controlling the operations of the PCIe computing system 100.

The root complex 120 may be a root hub, a controller hub, or a root controller in a PCIe interconnection architecture. For example, the root complex 120 may include a chipset, a memory controller hub (MCH), a northbridge, an interconnect controller hub (ICH), a southbridge, and a root controller/hub. In addition, the root complex 120 may connect the CPU 110 and the memory 130 to an I/O hierarchy. The root complex 120 may support peer-to-peer (P2P) routing. The root complex 120 may include at least one host bridge and root port. The root complex 120 may support at least one PCIe port.

The memory 130 may store data, commands or program codes necessary for operations of the PCIe computing system 100. According to an embodiment, the memory 130 may store program codes that are operable to execute one or more operating systems (OS) and virtual machines (VM), and program codes that execute a virtualization intermediary (VI) for managing the virtual machines (VM). In addition, the memory 130 may be realized as a volatile memory device such as DRAM or SRAM.

The switch 140 may route packets or messages upstream or downstream. More specifically, the switch 140 may route packets or messages up a hierarchy toward the root complex 120 from a PCIe endpoint (e.g., 150_1). Alternatively, however, the switch 140 may route packets or messages down a hierarchy away from the root complex 120 toward a PCIe endpoint (e.g., 150_2).

The switch 140 may be referred to as a logic assembly of a plurality of virtual PCI-to-PCI bridge devices. Examples of devices that are connected to the switch 140 may include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices.

Each of the PCIe endpoints 150_1 to 150_3 and the legacy endpoints 160_1 and 160_2 may serve as a requester or a completer of a PCIe transaction. Transaction layer packets (TLPs), which are transmitted or received by the PCIe endpoints 150_1 to 150_3 and the legacy endpoints 160_1 and 160_2, may provide configuration space headers. In addition, each of the PCIe endpoints 150_1 to 150_3 and the legacy endpoints 160_1 and 160_2 may provide a configuration request as a completer. Under specific conditions, transaction layer packets (TLPs) that are transmitted or received by the PCIe endpoints 150_1 to 150_3 and the legacy endpoints 160_1 and 160_2 must provide configuration space headers. In addition, each of the PCIe endpoints 150_1 to 150_3 and the legacy endpoints 160_1 and 160_2 must provide a configuration request as a completer.

The PCIe endpoints 150_1 to 150_3 and the legacy endpoints 160_1 and 160_2 may be classified depending on the possible size of the memory transaction. For example, when a memory transaction exceeding 4 GB is possible, an endpoint may be a PCIe end point (150_1 to 150_3). On the other hand, when a memory transaction exceeding 4 GB is impossible, an endpoint may be a legacy endpoint (160_1 and 160_2). While the PCIe endpoints 150_1 to 150_3 are not permitted to generate I/O requests, the legacy endpoints 160_1 and 160_2 may provide or generate I/O requests. In addition, the PCIe endpoint 150_3 may transmit or receive the TLPs to or from the root complex 120. Furthermore, PCI/PCI-X may transmit or receive the TLPs to or from the root complex 120 through the PCIe to PCI/PCI-X bridge 170. In addition, the PCIe endpoints 150_1 and 150_2 and the legacy endpoints 160_1 and 160_2 may transmit or receive the TLPs to or from the switch 140.

Figure 2:
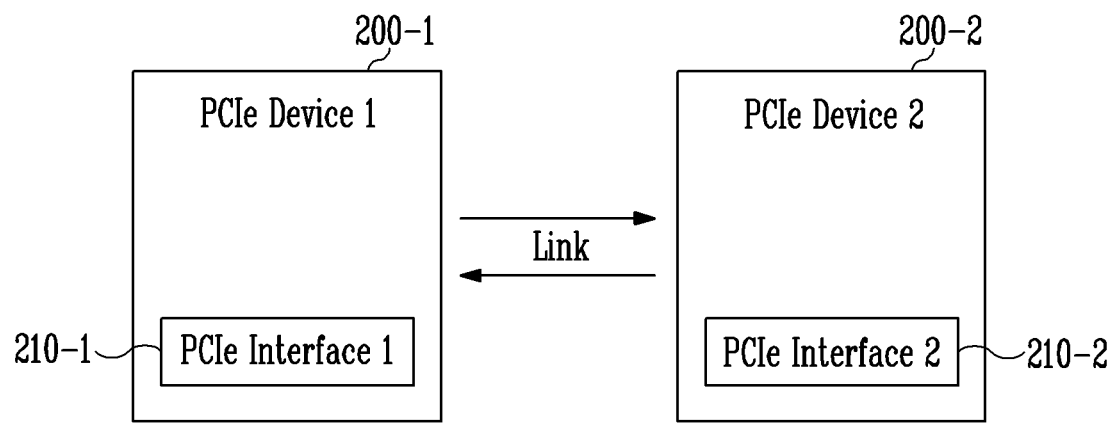
FIG. 2 is a diagram illustrating a PCIe device according to an embodiment of the present disclosure.

FIG. 2 is a diagram illustrating a PCIe device according to an embodiment of the present disclosure.

Referring to FIG. 2, a PCIe device may include a PCIe interface and be an electronic device that supports transmission and reception using the PCIe interface. For example, a first PCIe device 200-1 or a second PCIe device 200-2 may include one of the root complex 120, the switch 140, the PCIe endpoints 150_1 to 150_3, the legacy endpoints 160_1 and 160_2, and the PCIe to PCI/PCI-X bridge 170 as shown in FIG. 1.

In addition, the first PCIe device 200-1 or the second PCIe device 200-2 may perform communication using a first PCIe interface 210-1 or a second PCIe interface 210-2, respectively. More specifically, the first PCIe device 200-1 may convert data to be transmitted from the second PCIe device 200-2 into a protocol adapted for communication by using the first PCIe interface 210-1. In addition, the first PCIe device 200-1 and the second PCIe device 200-2 may form a link. The first PCIe device 200-1 and the second PCIe device 200-2 may perform communication through the link. For example, the first PCIe device 200-1 or the second PCIe device 200-2 may transmit or receive packets through the link.

Figure 3:
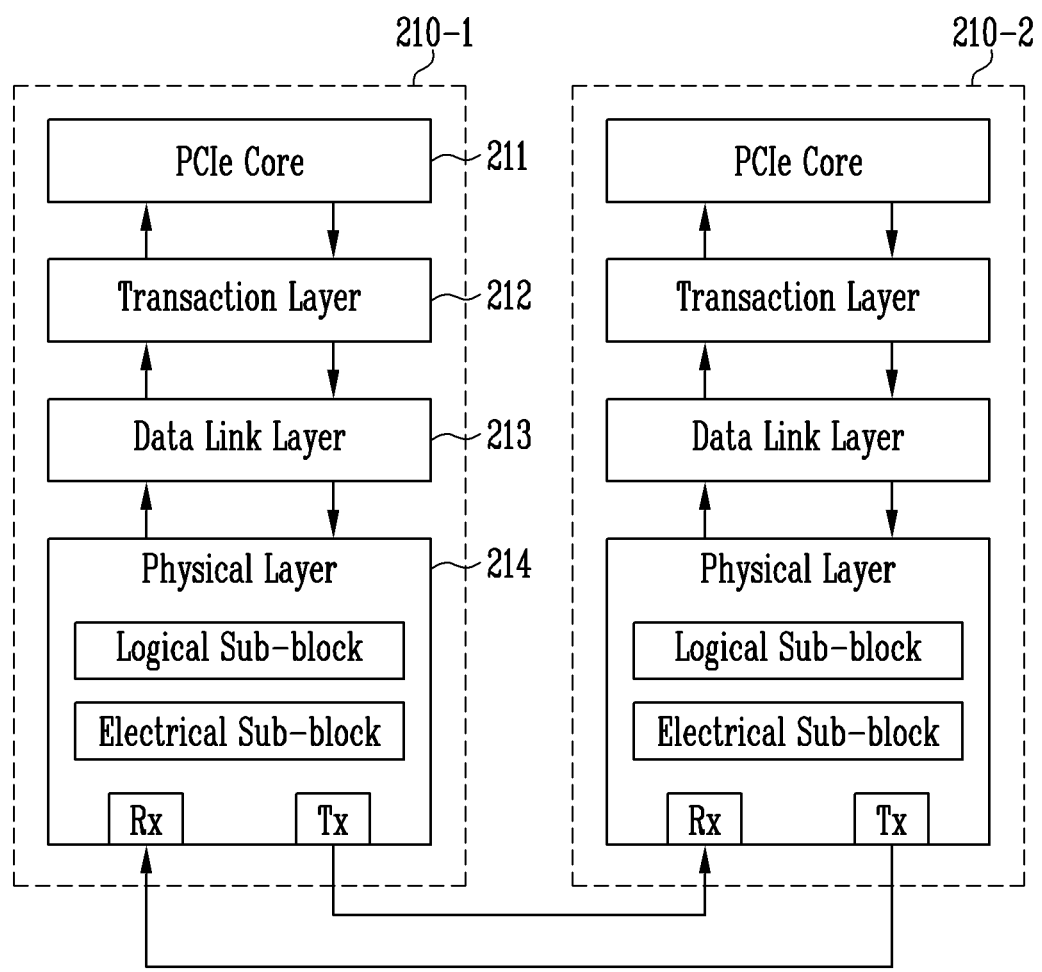
FIG. 3 is a diagram illustrating PCIe interfaces according to an embodiment of the present disclosure.

FIG. 3 is a diagram illustrating PCIe interfaces according to an embodiment of the present disclosure.

FIG. 3 shows the first PCIe interface 210-1 and the second PCIe interface 210-2 of FIG. 2. The first PCIe interface 210-1 and the second PCIe interface 210-2 may have the same structure. Thus, a description of the first PCIe interface 210-1 below may be equally applied to the second PCIe interface 210-2.

PCIe layers included in the first PCIe interface 210-1 may include three discrete logical layers. For example, the first PCIe interface 210-1 may include a PCIe core 211, a transaction layer 212, a data link layer 213, and a physical layer 214. Each of the layers (212, 213 and 214) may include two sections. More specifically, one section TX may process outbound information (or information to be transmitted), and the other section RX may process inbound information (or information received). In addition, the first PCIe interface 210-1 may use packets for communicating information with other PCIe interfaces.

The PCIe core 211 may control the entire first PCIe interface 210-1. More specifically, the PCIe core 211 may include a software layer for operating the interface. In addition, the PCIe core 211 may transfer an address, a transaction type, and data to the transaction layer 212, or may receive an address, a transaction type, and data from the transaction layer 212.

The transaction layer 212 may be an upper layer in the architecture of the PCIe interface. The transaction layer 212 may assemble and disassemble transaction layer packets (TLPs). In addition, the transaction layer 212 may implement a split transaction, i.e., a transaction that allows other traffic to be transmitted to a link while a target system assembles data for responses. For example, the transaction layer 212 may implement a transaction in which a request and a response are temporally separated from each other. According to an embodiment, four transaction address spaces may consist of a configuration address space, a memory address space, an input/output address space, and a message address space. A memory space transaction may include at least one of a read request and a write request for transmitting data from/to a memory-mapped location. According to an embodiment, the memory space transaction may use two different address formats, for example, a short address format such as a 32-bit address, or a long address format such as a 64-bit address. A configuration space transaction may be used to access a configuration space of a PCIe device. A transaction directed toward the configuration space may include a read request and a write request. A message space transaction (or message) may be defined to support in-band communication between PCIe devices.

The transaction layer 212 may store link configuration information received from the PCIe core 211. In addition, the transaction layer 212 may generate TLPs requested by the PCIe core 211 or may convert the received TLPs into payload or status information.

A middle layer in the architecture of the PCIe interface may be the data link layer 213. The data link layer 213 may serve as an intermediate stage between the transaction layer 212 and the physical layer 214. The primary responsibilities of the data link layer 213 may include link management and data integrity, including error detection and error correction. More specifically, a transmission side of the data link layer 213 may accept the TLPs assembled by the transaction layer 212, apply a data protection code, or calculate a TLP sequence number. In addition, the transmission side of the data link layer 213 may transmit the data protection code and the TLP sequence number to the physical layer 214. A reception side of the data link layer 213 may check the integrity of the TLPs received from the physical layer 214 and transmit the TLPs to the transaction layer 212 for further processing.

The physical layer 214 may include circuitry for an interface operation. The physical layer 214 may include a driver, an input buffer, a serial-to-parallel conversion circuit, a parallel-to-serial conversion circuit, phase locked loops (PLLs), and impedance matching circuitry.

In addition, the physical layer 214 may include logical sub-blocks and electrical sub-blocks that physically transmit packets to an external PCIe device. A logical sub-block may serve to perform a 'digital' function of the physical layer 214. More specifically, a logical sub-block may include a transmit section that prepares transmission information by a physical sub-block and a receiver section that identifies and prepares received information before passing the received information to the data link layer 213. The physical layer 214 may include a transmitter Tx and a receiver Rx. The transmitter Tx may receive a symbol that is serialized by the transmitter and transmitted to an external device by the logical sub-block. In addition, the receiver Rx may receive the serialized symbol from the external device and convert the received signal into a bit stream. The bit stream may be de-serialized and supplied to the logical sub-block. In other words, the physical layer 214 may convert the TLPs received from the data link layer 213 into a serialized format and convert packets received from an external device into a de-serialized format. In addition, the physical layer 214 may include logical functions related to interface initialization and maintenance.

FIG. 3 exemplifies the architectures of the first PCIe interface 210-1 and the second PCIe interface 210-2. However, the architectures of PCIe interfaces in other embodiments may include any architecture such as a quick path interconnect architecture, a next generation high performance computing interconnect architecture, or another layered architecture.

Figure 4:
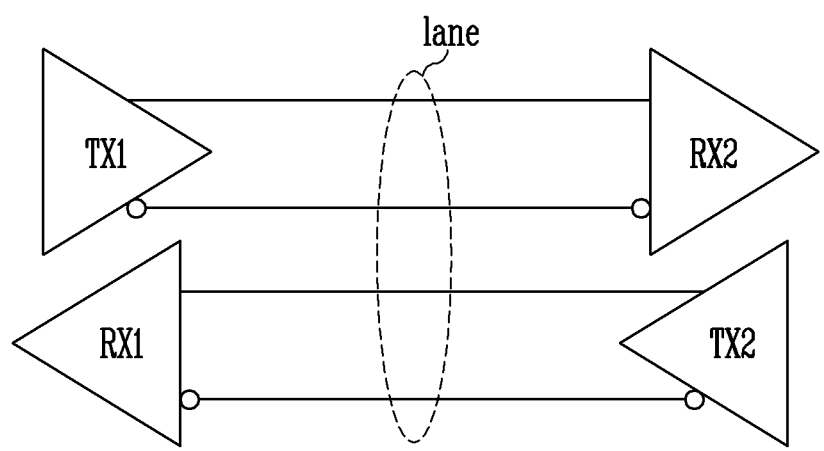
FIG. 4 is a diagram illustrating a transmitter, a receiver, and a lane according to an embodiment of the present disclosure.

FIG. 4 is a diagram illustrating a transmitter, a receiver, and a lane according to an embodiment of the present disclosure.

FIG. 4 illustrates a first transmitter TX1, a second transmitter TX2, a first receiver RX1, and a second receiver RX2. A lane may include paths that include differentially driven signal pairs, e.g., a transmission path pair configured for transmission and a reception path pair configured for reception. A PCIe device may include transmission logic that transmits data to another PCIe device and reception logic that receives data from another PCIe device. For example, a PCIe device may include two transmission paths coupled to the first transmitter TX1 and two reception paths coupled to the first receiver RX1.

A transmission path may refer to an arbitrary path for data transmission, such as a transmission line, a copper line, a wireless communication channel, an infrared communication link, or another communication path. In addition, a reception path may be realized in the same manner as the transmission path, and the reception path may be provided for reception.

A connection between two PCIe devices, for example the first PCIe device 200-1 and the second PCIe device 200-2 as shown in FIG. 2, may be referred to as a link. A link may support at least one lane. In addition, each lane may be indicated by a set of differential signal pairs (one pair for transmission and the other pair for reception). A differential signal pair may refer to two signals that have the same frequency and amplitude, but opposite phases. For example, when a first signal has a rising edge that toggles from 0 to a voltage level of V+, a second signal may have a falling edge that toggles from 0 to a voltage level of V−. A PCIe device may use signal integrity, for example, electrical characteristics such as cross-coupling, voltage overshoot/undershoot, and ringing, and may control the transmission frequency more quickly by using differential signals. In addition, a PCIe device may include a plurality of lanes to control bandwidth. For example, two PCIe devices may form a link that consists of 1, 2, 4, 8, 12, 16, or 64 lanes.

Figure 5:
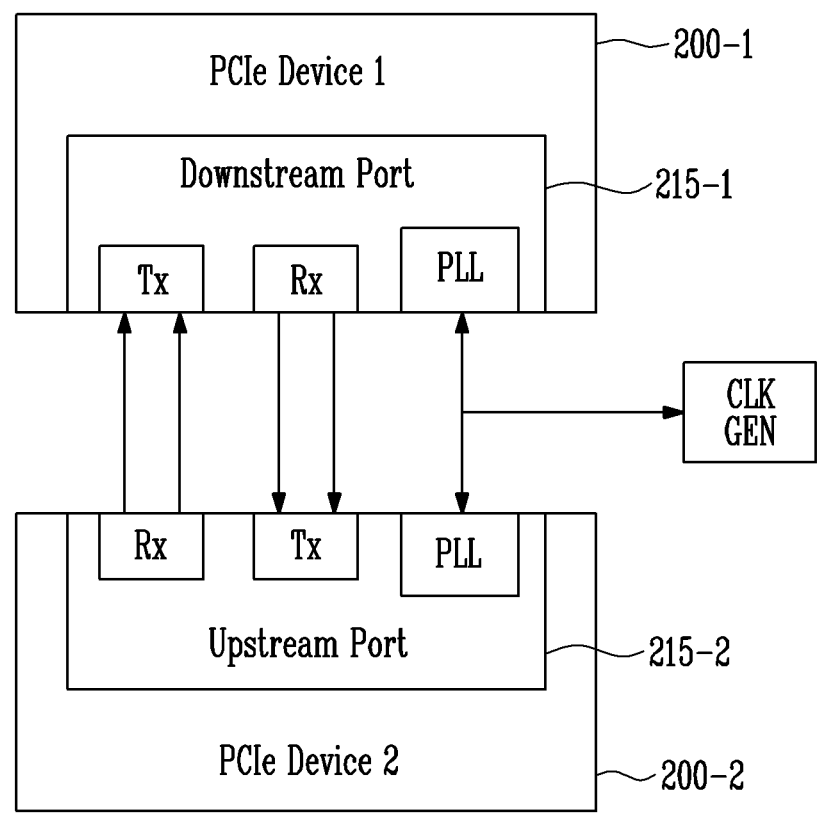
FIG. 5 is a diagram illustrating ports according to an embodiment of the present disclosure.

FIG. 5 is a diagram illustrating ports according to an embodiment of the present disclosure.

As illustrated in FIG. 5, a downstream port 215-1 and an upstream port 215-2 may be included in the first PCIe device 200-1 and the second PCIe device 200-2, respectively. According to an embodiment, the first PCIe device 200-1 may be an upper layer compared to the second PCIe device 200-2. Data movement and transfer to an upper layer may be referred to as "upstream". On the other hand, data movement and transfer to a lower layer may be referred to as "downstream". For example, referring to FIG. 1, the switch 140 may support downstream and upstream routing. More specifically, upstream may refer to routing up a hierarchy towards the root complex 120 from the PCIe endpoint (e.g., 150_1), and downstream may refer to routing down a hierarchy away from the root complex 120 towards the PCIe endpoint (e.g., 150_2).

Each of the downstream port 215-1 and the upstream port 215-2 may include a transmitter Tx, a receiver Rx and a phase locked loop (PLL) circuit. The PLL circuit may generate a clock signal to be supplied to the transmitter Tx or the receiver Rx by multiplying a signal provided from a clock signal generator CLK GEN. The PLL circuit may multiply a signal received from the clock signal generator CLK GEN to generate a clock signal with a changed frequency. For example, the PLL circuit may multiply a reference clock signal REFCLK having a frequency of 100 MHz to create a clock signal having a frequency of 2.5 GHz. A transmitter Tx may convert a parallel data signal into a serial data signal by using an output signal of the PLL circuit and may transmit the serial data signal to an external device, for example, an external PCIe device. A receiver Rx may receive a serial data signal transmitted from an external device to generate a clock signal for recovering the received serial data signal and a clock signal for converting the recovered serial data signal into a parallel data signal by using an output signal of the PLL circuit. The clock signal generator CLK GEN may generate the reference clock signal REFCLK used in operations of a PCIe interface. The operations of a PCIe interface may correspond to communication with an external PCIe device.

Figure 6:
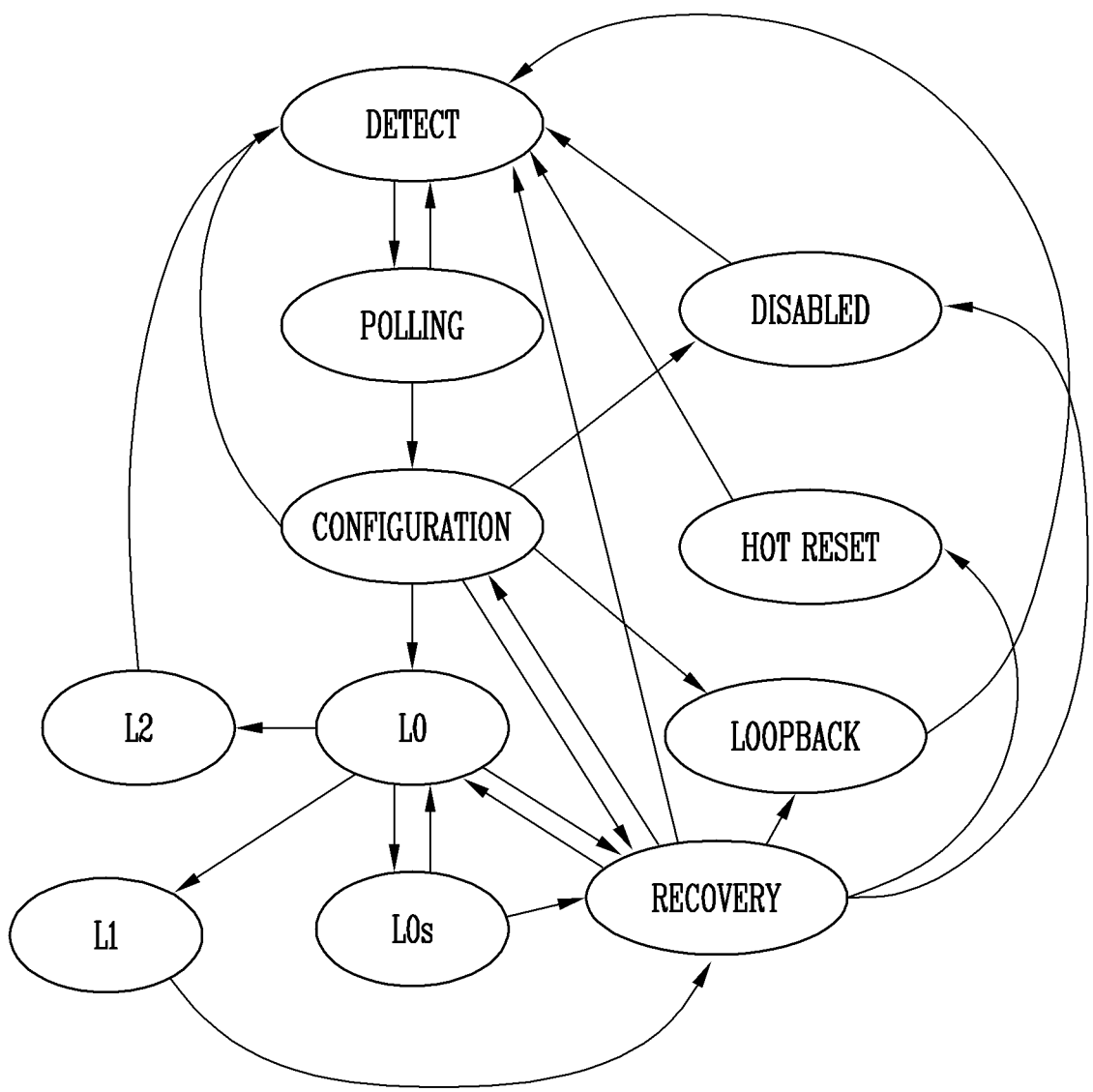
FIG. 6 is a diagram illustrating a link status of a PCIe device according to an embodiment of the present disclosure.

FIG. 6 is a diagram illustrating a link status of a PCIe device according to an embodiment of the present disclosure.

As shown in FIG. 6, a link status of a PCIe device may include detect, polling, configuration, hot reset, disabled, and L0 states.

The detect state may refer to an initial state after power on or reset. The detect state may be entered from the states to be described below. For example, the detect state may be entered from the configuration state, the hot reset state, the disabled state, an L2 state, a loopback state, and a recovery state. In the detect state, all logics, ports and registers may be reset, and a link coupled to the PCIe interface may be detected. In other words, a PCIe device in the detect state may search for a physically coupled lane.

In the polling state, a lane that enables data communication may be distinguished from the detected lanes. In the polling state, clocks at both ends of the PCIe interface may be synchronized and it may be confirmed whether the lane has a polarity of D+ or D−, for example. In addition, a data transmission speed available for the lane may be checked. In other words, in the polling state, polarity inversion may be checked. In addition, a link in the polling state may enter the detect state or the configuration state.

In the configuration state, a connection state of the lane may be checked. More specifically, in the configuration state, a lane width that enables data communication may be determined. In addition, in the configuration state, a lane reversal may be checked. The configuration state may be entered from the polling state. Alternatively, however, after entering the L0 state, the configuration state may be entered in the event of a lane reduction or a lane width increase.

The recovery state may be used to reconfigure a link bandwidth. In the recovery state, a link bandwidth of a set link may be changed, and bit lock, symbol lock and lane-to-lane de-skew may be reset. The recovery state may be entered when an error occurs in the L0 state. Thereafter, after the error is recovered in the recovery state, the state may be changed into the L0 state. In addition, according to an embodiment, in the recovery state, an equalization operation of the link may be performed.

The L0 state may be a normal operational state in which data and packets are transmitted and received through the link. More specifically, the L0 state may be an operational state of a physical bus interface where data and control packets may be transmitted and received. The L0 state may be a fully active state.

The L0s state may refer to a state in which the physical bus interface may enter quickly from a power conservation state and recover therefrom without going through the recovery state. The L0s state may be a power saving state. The L0s state may refer to an idle or standby state of some functions in the interface.

The L1 state may be a power saving state. The L1 state may refer to a power saving state that allows additional power savings over the L0s state. The L1 state may be a low power standby state.

The L2 state may be a power saving state that aggressively conserves power. Most of the transmitters and receivers may be shut off. Although a main power supply and clocks are not guaranteed, an auxiliary power supply may be provided. The L2 state may be a low power sleep state in which power is not supplied to most of the functions.

The loopback state may be intended for test and fault isolation use. The loopback state may operate on a per lane basis and a loopback receive lane must be selected and configured.

The disabled state may allow a set link to be disabled until directed. The hot reset state may only be triggered by the downstream port. The downstream port may use training sequences (e.g., TS1 or TS2) to propagate hot reset. The training sequences TS may be composed of ordered sets used for initializing bit alignment, symbol alignment and to exchange physical layer parameters.

Figure 7:
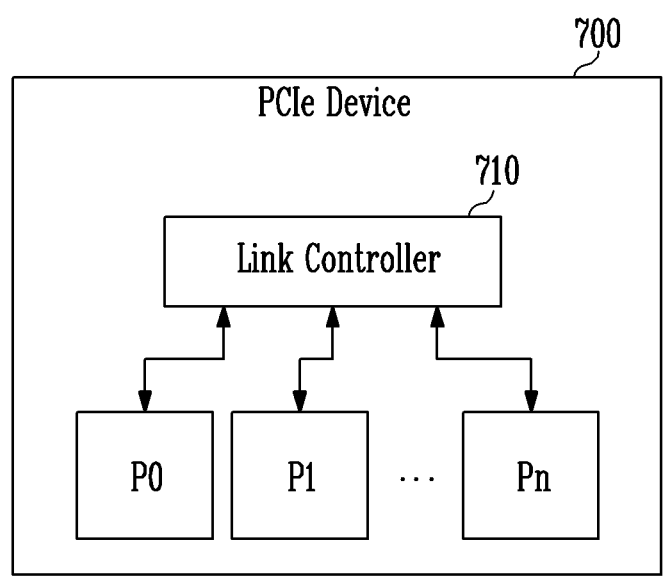
FIG. 7 is a diagram illustrating a PCIe device according to an embodiment of the present disclosure.

FIG. 7 is a diagram illustrating a PCIe device according to an embodiment of the present disclosure.

A PCIe device 700 may include a plurality of ports P0 to Pn and a link controller 710.

The plurality of ports P0 to Pn may form a plurality of lanes. For example, as shown in FIG. 4, one port may form one lane with one port in another PCIe device. According to embodiments of the disclosure, each of the plurality of ports P0 to Pn may be a downstream port, or each of the plurality of ports P0 to Pn may be an upstream port. For example, when the plurality of ports P0 to Pn are downstream ports, the PCIe device 700 may be an upstream component. In addition, when the plurality of ports P0 to Pn are upstream ports, the PCIe device 700 may be a downstream component. Each of the plurality of ports P0 to Pn may include a receiver and a transmitter.

The link controller 710 may set a link. A link may include the plurality of ports P0 to Pn. In other words, a link may be formed with the plurality of ports P0 to Pn. For example, the link controller 710 may perform a link setting operation for setting a link. The link setting operation may refer to a process of initializing and configuring a link so that the link may operate normally. The link setting operation may refer to a link initialization & training operation according to a specification of the PCIe device.

According to an embodiment, the link controller 710 may include a Link Training and Status State Machine (LTSSM). The LTSSM may be a component for performing the link setting operation.

The link controller 710 may perform link width and lane number negotiation. The link width may indicate the number of lanes that form a link. For example, the link controller 710 may determine the link width when setting the link. A lane number may indicate a number assigned to each lane. For example, during the lane setting process, the link controller 710 may negotiate a number to be assigned to each lane and determine a lane number of each lane according to the negotiation. The determined lane number may be transferred to another PCIe device, which may then accept the corresponding lane number.

According to an embodiment, the link controller 710 may detect a fail lane among a plurality of lanes during the link setting process. The fail lane may have a state in which it is unable to form a link with other lanes. Remaining lanes may refer to all lanes except for the fail lane. For example, when an error occurs in a transmission path or a reception path included in a lane, the corresponding lane may be a fail lane. The fail lane may not operate properly when transmitting data. For example, when a link is in a detect state, the link controller 710 may detect a fail lane by performing a link setting operation corresponding to the detect state. The link setting operation corresponding to the detect state may be performed to set a link in the detect state and may include an operation for detecting both ends of a link. For example, both ends of a link may be ports included in different PCIe devices coupled to each other through the link. Thereafter, the link controller 710 may perform a link setting operation corresponding to the detect state on the remaining lanes, except for the fail lane.

In addition, when a link is in a polling state, the link controller 710 may detect a fail lane by performing a link setting operation corresponding to the polling state. The link setting operation corresponding to the polling state may be performed to set the link and may include an operation of transmitting and receiving a training sequence ordered set. For example, the link setting operation corresponding to the polling state may include transmitting and receiving the training sequences ordered sets between the ports coupled through the link. Thereafter, the link controller 710 may perform the link setting operation corresponding to the polling state on the remaining lanes.

According to an embodiment, the link controller 710 may set a link to have a link width including the remaining lanes. For example, when the link is in a configuration state, a link setting operation corresponding to the configuration state may be performed on the remaining lines. The link setting operation corresponding to the configuration state may be performed to set the link in the configuration state. For example, the link setting operation corresponding to the configuration state may include setting a link width, determining a lane number, and performing a lane to lane de-skew operation.

For example, the link controller 710 in the configuration state may determine a link number of a link and a lane number of each of the remaining lanes. The link controller 710 may determine the lane number of each of the remaining lanes through a lane number negotiation operation. According to an embodiment, the link controller 710 may determine the lane number of each of the remaining lanes, and the lane number of each of the remaining lanes may increase or decrease sequentially in order.

According to an embodiment, the link controller 710 may provide other ports forming a plurality of lanes with the plurality of ports P0 to Pn with the determined link number and the determined lane numbers of the remaining lanes through the plurality of ports P0 to Pn. The other ports may be included in another PCIe device different from the PCIe device 700. For example, the link controller 710 may provide the determined link number and the determined lane number of each of the remaining lanes to other ports by using the training sequences ordered sets. Another PCIe device may accept the link number and the lane number of each of the remaining lanes.

Figure 8:
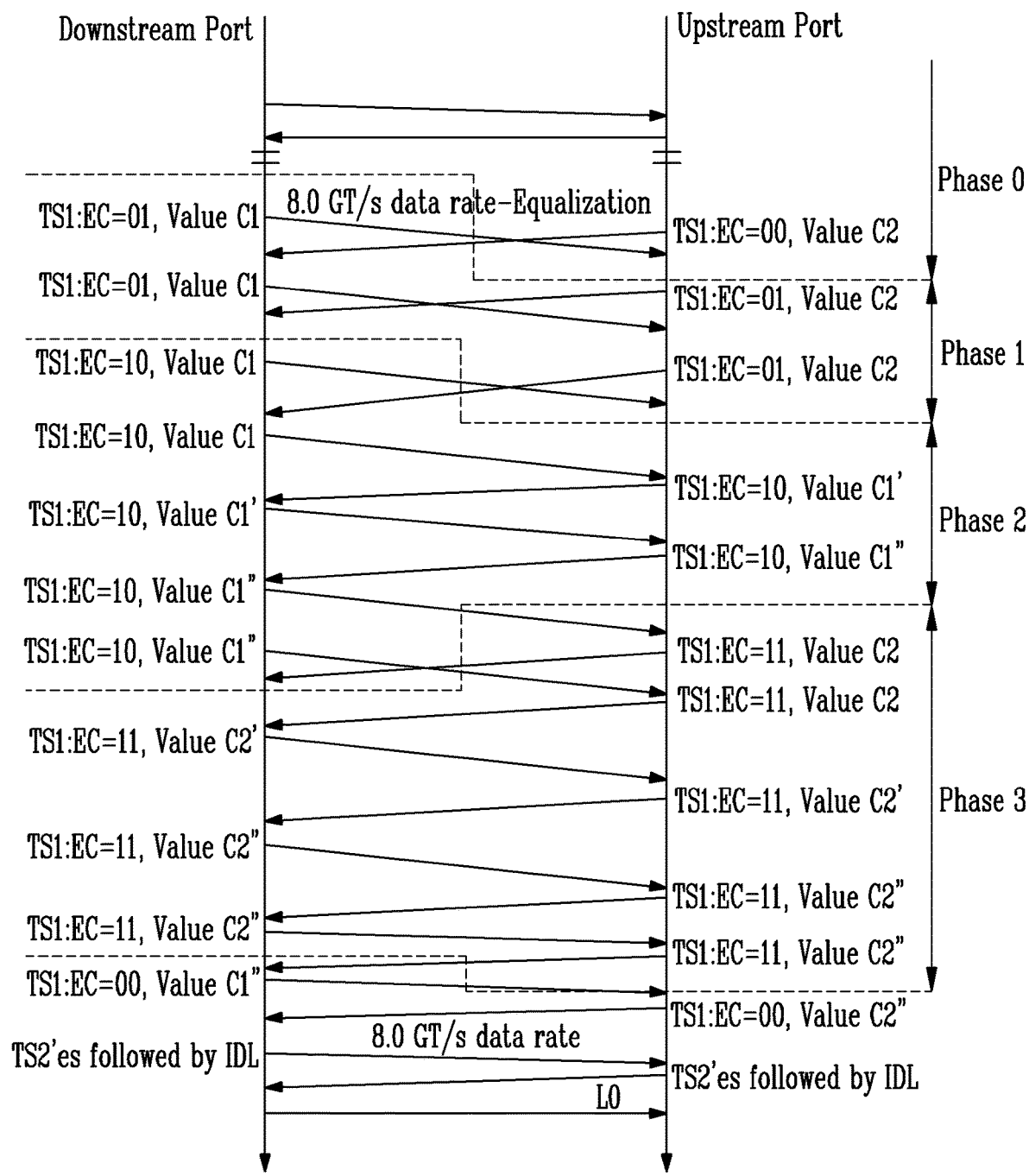
FIG. 8 is a diagram illustrating an equalization operation according to an embodiment of the present disclosure.

FIG. 8 is a diagram illustrating an equalization operation according to an embodiment of the present disclosure.

An equalization operation may be performed to adjust the transmitter and the receiver settings of each lane to improve the quality of signals being transmitted and received, and to satisfy specific requirements. In other words, every lane related to Link Training & Status State Machine (LTSSM) may perform an equalization operation. In addition, the equalization operation may be autonomously performed by the PCIe interface, or may be controlled by the host. The equalization operation may be completed at a low data rate and may then be performed at a high data rate. However, an equalization operation may be skipped at a specific data rate, and the upstream port and the downstream port may advertise the specific data rate at which the equalization operation is skipped by using TS1 or TS2.

Referring to FIG. 8, the upstream port and the downstream port may perform an equalization operation, which consists of up to four phases. The equalization operation may consist of a zero-th phase Phase 0 to a third phase Phase 3. In addition, the equalization operation may be performed by the physical layer.

The zero-th phase Phase 0 may refer to a phase that is performed while a data rate at which the equalization operation is performed is determined. For example, when a change to a data rate from 2.5 GT/s to 8.0 GT/s is determined, the downstream port and the upstream port may transmit and receive TS2 ordered sets (OSs). More specifically, the downstream port may transfer a transmitter preset value and a receiver preset value for each lane subject to 8b/10b encoding or 128/130b encoding to the upstream port by using the TS2 OSs in Recovery.RcvrCfg. For example, when an equalization operation is performed at 8.0 GT/s, TS2 OSs may include information about an 8.0 GT/s transmitter preset value of the upstream port and an 8.0 GT/s receiver preset value of the upstream port of each lane. In addition, the upstream port may transmit TS1 OSs with the received preset values. When the equalization operation is performed, phase information indicating a phase of equalization may be transmitted using an Equalization Control (EC) field of the TS1 OSs. For example, in the zero-th phase Phase 0, the phase information may be exchanged by exchanging the TS1 OSs with the EC field of "00".

In the first phase Phase 1, the downstream port and the upstream port may exchange the TS1 OSs to perform the fine-tuning of the transmitter/receiver pairs. In other words, the downstream port and the upstream port may exchange the TS1 OSs to set an operational link. More specifically, the downstream port may initiate the first phase by transmitting the TS1 OSs with the EC field of "01". The upstream port, after adjusting the receiver, if necessary, may receive the TS1 OSs and transition to the first phase. In addition, the upstream port may transmit the TS1 OSs with the EC field of "01". The downstream port may ensure that the downstream port may reliably receive the bit stream from the upstream port to continue through the rest of the phases when the downstream port receives the TS1 OSs from the upstream port with the EC field of "01" before the downstream port moves on to the second phase.

In the second phase Phase 2, the upstream port may adjust the transmitter settings of the downstream port along with the receiver settings thereof. In other words, the upstream port may request the downstream port to set coefficients and preset settings of the transmitter to ensure that the upstream port may reliably receive the bit stream compliant with the specific requirements. For example, the upstream port may adjust the receiver setting of the upstream port and request the transmitter setting of the downstream port so that each lane may have a bit error rate (BER) less than $10^{-12}$.

The downstream port may initiate the second phase by transmitting the TS1 OSs with the EC field of "10" to the upstream port. The downstream port may provide the upstream port with information about the transmitter coefficients and the preset settings of the downstream port. In addition, the upstream port may receive the information about the transmitter coefficients and the preset settings of the downstream port from the downstream port, and may request to change the transmitter coefficients or preset settings of the downstream port. In addition, the upstream port may continue to evaluate each setting until the upstream port arrives at the best setting for operating the downstream lanes within a limited time. In addition, after the upstream port has completed the second phase, the upstream port may move to the third phase by transmitting the TS1 OSs with the EC field of "11" to the downstream port.

In the third phase Phase 3, the downstream port may adjust the transmitter setting of the upstream port. In other words, the downstream port may request the upstream port to set the transmitter coefficients and the preset settings of the upstream port so that an incoming link is compliant with specific requirements.

The downstream port may receive the information about the transmitter coefficients and the preset settings of the upstream port from the upstream port, and may request the transmitter coefficients or the preset settings of the upstream port. In addition, the downstream port may continue to evaluate each setting until the downstream port arrives at the best setting for operating the upstream lanes within a limited time. In addition, after the downstream port has completed the third phase, the downstream port may transmit the TS1 OSs with the EC field of "00" to the upstream port to notify that the equalization operation is terminated.

After the equalization operation is completed, the link status may transition from Recovery.RcvrLock, Recovery.RcvrCfg, and Recovery.Idle to the L0 state. This will be described in detail with reference to FIG. 9.

Figure 9:
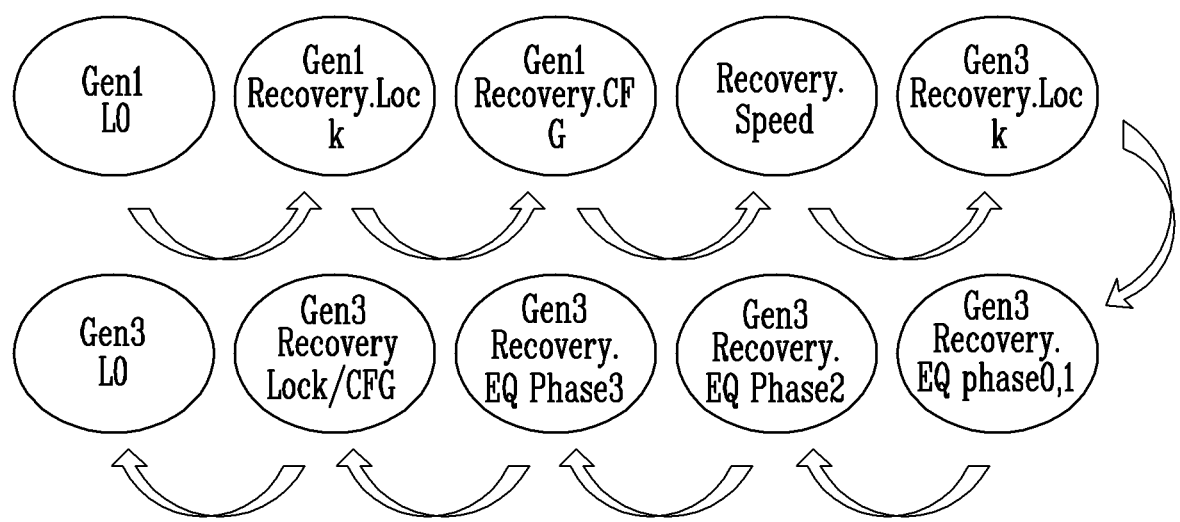
FIG. 9 is a diagram illustrating changes in link status during an equalization operation according to an embodiment of the present disclosure.

FIG. 9 is a diagram illustrating changes in link status during an equalization operation according to an embodiment of the present disclosure.

FIG. 9 shows that the link status transitions from Gen1 L0 state to Gen3 L0 state. Gen1 and Gen3 each may be a single mode operating in an upstream port or a downstream port and may include different data rates. As described above with reference to FIG. 8, the equalization operation may be performed along with variations in data rates. The link status of the upstream port and the downstream port may enter a recovery state by transmitting TS1 OSs from a port where a data rate is to change from the Gen1 L0 state to the Gen1 Recovery.Lock state to an opposite port. Gen1 L0 may refer to a state where data and control packages are transmitted or received normally. Thus, the port that receives the TS1 OSs in the Gen1 Recovery.Lock state may be regarded as obtaining block alignment after the end of the last data stream. Then, the Gen1 Recovery.CFG state may be entered. In the Gen1 Recovery.CFG state, receivers of all lanes configuring a link may receive eight TS1 OSs or the TS2 OSs successively. In addition, when a speed change bit indicating a change in data rate is set in the TS1 OSs or the TS2 OSs received in the Gen1 Recovery.CFG state, the downstream port and the upstream port may change the data rates in the Recovery.Speed state. FIG. 9 illustrates data rate changes from Gen1 to Gen3. However, a change from Gen3 to Gen4 or a change from Gen1 to Gen 5 may also be applicable. In addition, the link status may enter Gen3 Recovery.Lock and Gen3 Recovery.EQ phase0, 1. The Gen3 Recovery.EQ phase0, 1 state may be the same as the zero-th phase Phase 0 and the first phase Phase 1 as shown in FIG. 8. In the Gen3 Recovery.EQ phase0, 1 state, the downstream port and the upstream port may exchange full swing (FS) and low frequency (LF). In addition, the downstream port and the upstream port may sweep EQ coefficients on the basis of the FS and LF values in the Gen3 Recovery.EQ Phase2 state and the Gen3 Recovery.EQ Phase3 state. The Gen3 Recovery.EQ Phase2 state may be maintained for up to 24 ms. The limited time of 24 ms may not be enough to meet the condition of having a bit error rate of BER $10^{-12}$ or less.

Figure 10:
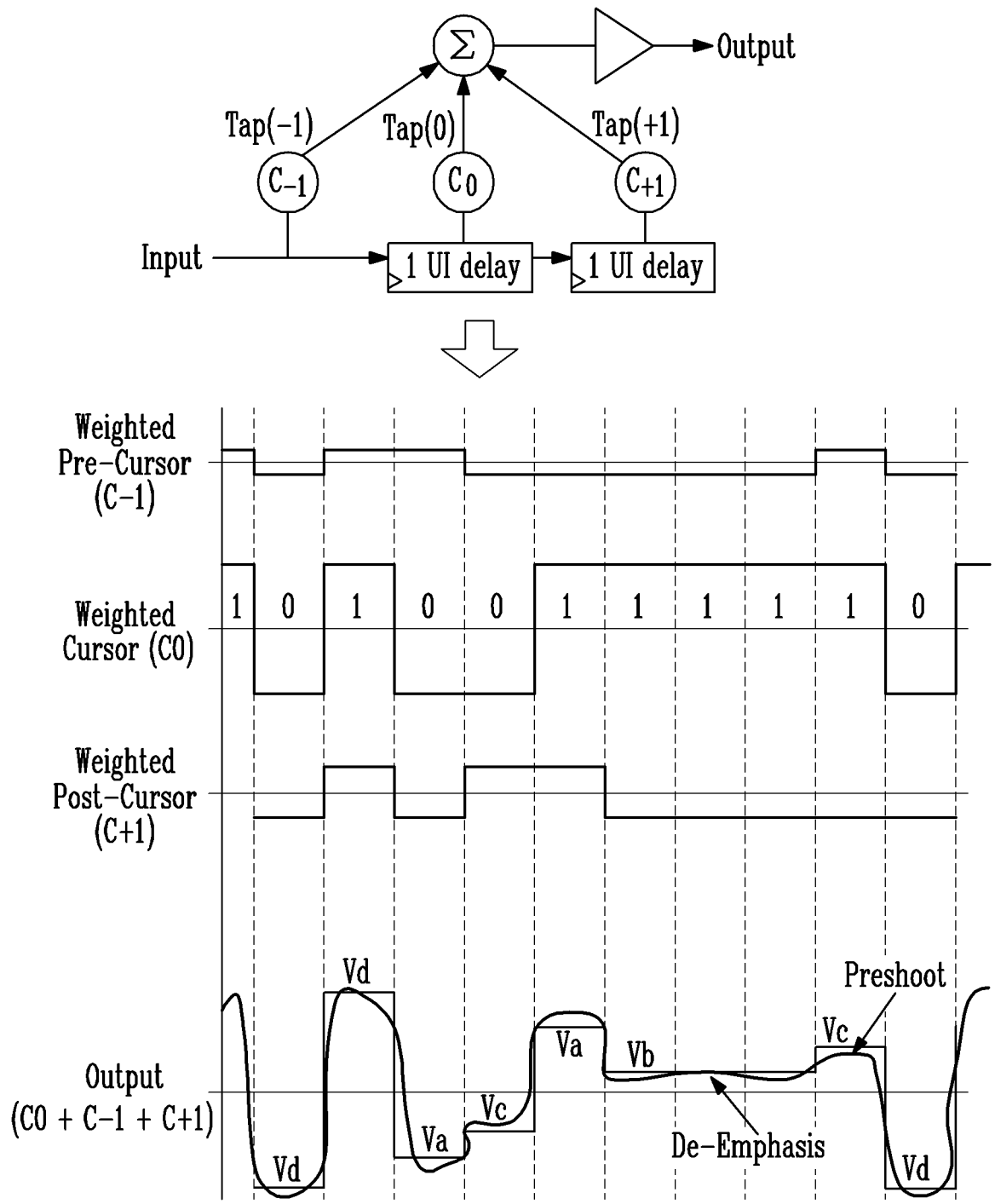
FIG. 10 is a diagram illustrating an EQ coefficient according to an embodiment of the present disclosure.

FIG. 10 is a diagram illustrating an EQ coefficient according to an embodiment of the present disclosure.

FIG. 10 shows a graph of an EQ coefficient which includes a pre-cursor, a cursor, and a post-cursor. In FIG. 10, C−1 and C+1 may be coefficients used in the FIR equation and represent the pre-cursor and the post-cursor, respectively. The pre-cursor value and the post-cursor value communicated in the TS1 OS may represent absolute values thereof. In addition, C0 may represent the cursor coefficient setting and may have a positive value. In addition, the sum of the absolute values of the coefficients may define the FS. In other words, FS may satisfy [Equation 2] below. In addition, FS may be transmitted to the link partner in the first phase (e.g., the opposite port). Furthermore, FS may have a value from 24 to 63 for full swing mode and a value from 12 to 63 for reduced swing mode. The transmitter may advertise the LF value during the first phase. The LF value may correspond to the minimum differential voltage than is generated by the transmitter which is LF/FS times the transmitter's maximum differential voltage. The transmitter may meet the specific requirements for $V_{TX-EIEOS-FS}$ and $V_{TX-EIEOS-RS}$. The transmitter must ensure that when [Equation 3] below equals LF, the transmitter must meet the specific requirements for $V_{TX-EIEOS-FS}$ and $V_{TX-EIEOS-RS}$. The transmitter may request a set of coefficients of the link partner's (e.g., the opposite port) transmitter. In addition, the following equations may be satisfied before the set of coefficients are requested to the link partner's (e.g., the opposite port) transmitter. Upon reception of an update request for TX coefficient settings, the port may verify that the update request meets the following equations and reject the update request if any of the equations is violated:

$$|C-1| \leq \text{Floor}(FS/4) \qquad \text{[Equation 1]}$$

$$|C-1|+C0+|C+1|=FS \qquad \text{[Equation 2]}$$

$$C0-|C-1|-|C+1| \geq LF \qquad \text{[Equation 3]}$$

According to an embodiment, the EQ coefficient as shown in FIG. 10 may be obtained by multiplying the values of the pre-cursor, the cursor and the post-cursor by the pre-cursor coefficient, the cursor coefficient and the post-cursor coefficient, respectively. At the time of output, "de-emphasis" effects as shown in FIG. 10 may be obtained by the coupling of the post-cursor, and significant "de-emphasis" effects may be produced in the differential signal. In addition, at the time of output, "pre-shoot" effects as shown in FIG. 10 may be obtained by the coupling of the pre-cursor, and noticeable voltage variations may appear when a voltage is reduced.

Figure 11A:
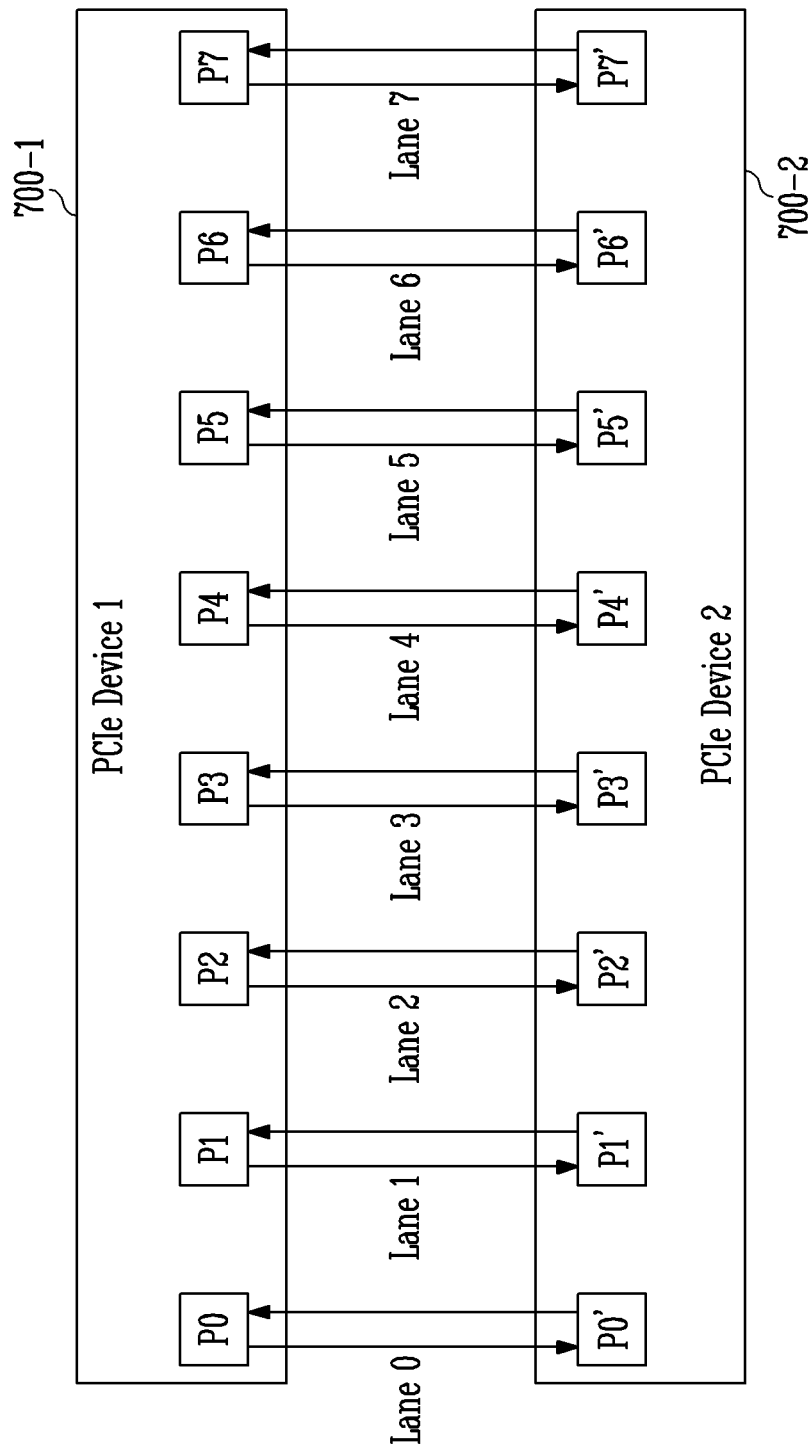
FIGS. 11A and 11B are diagrams illustrating a link setting operation according to an embodiment of the present disclosure.
Figure 11B:
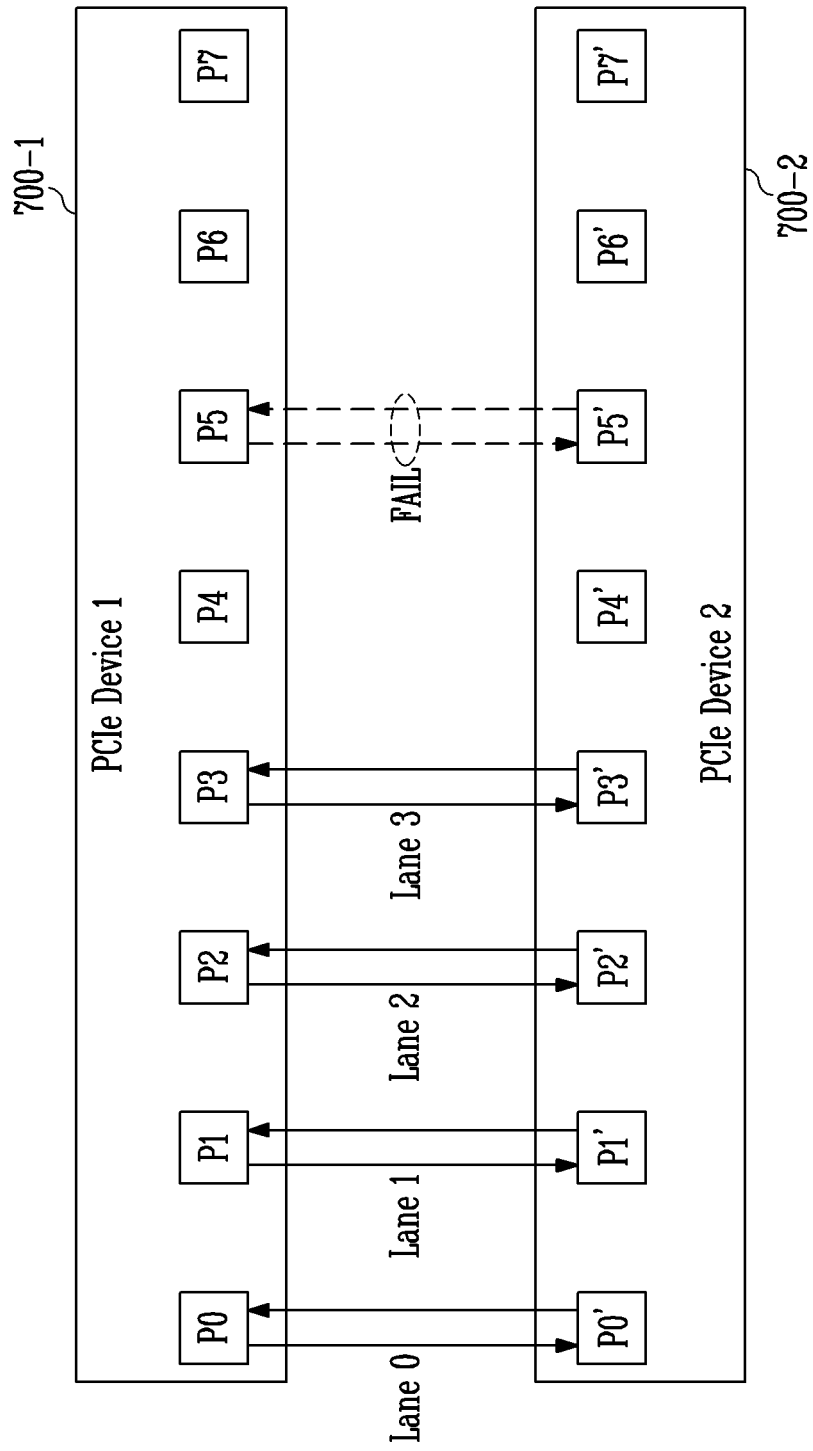

FIGS. 11A and 11B are diagrams illustrating a link setting operation according to an embodiment of the present disclosure.

Referring to FIG. 11A, a first PCIe device 700-1 and a second PCIe device 700-2 each may configure a PCIe device 700 of FIG. 7. For example, the first PCIe device 700-1 may include a plurality of downstream ports P0 to P7. In addition, the second PCIe device 700-2 may include a plurality of upstream ports P0' to P7'. However, according to other embodiments, ports included in the first PCIe device 700-1 may be upstream ports, while ports in the second PCIe device 700-2 may be downstream ports. According to an embodiment, the first PCIe device 700-1 may include downstream ports and the second PCIe device 700-2 may include upstream ports. In addition, as shown in FIG. 11A, each of the first PCIe device 700-1 and the second PCIe device 700-2 may include eight ports. However, the number of ports may vary.

The plurality of downstream ports P0 to P7 may form a plurality of lanes with the plurality of upstream ports P0' to P7'. The zero-th downstream port P0 and the zero-th upstream port P0' may form a zero-th lane Lane 0, the first downstream port P1 and a first upstream port P1' may form a first lane Lane 1, a second downstream port P2 and a second upstream port P2' may form a second lane Lane 2, a third downstream port P3 and a third upstream port P3' may form a third lane Lane 3, a fourth downstream port P4 and a fourth upstream port P4' may form a fourth lane Lane 4, a fifth downstream port P5 and a fifth upstream port P5' may form a fifth lane Lane 5, a sixth downstream port P6 and a sixth upstream port P6' may form a sixth lane Lane 6, and a seventh downstream port P7 and a seventh upstream port P7' may form a seventh lane Lane 7. The above operations of forming the lanes may occur with a link width and lane number negotiation operation.

FIG. 11B shows an example in which a lane between the fifth downstream port P5 and the fifth upstream port P5' corresponds to a fail lane when the first PCIe device 700-1 and the second PCIe device 700-2 set a link.

The first PCIe device 700-1 may perform a lane number negotiation on the plurality of downstream ports P0 to P7 so that port numbers of the plurality of downstream ports P0 to P7 increase sequentially. Therefore, according to the PCIe specifications, since the lane between the fifth downstream port P5 and the fifth upstream port P5' is a fail lane, lane number negotiation for the sixth downstream port P6 and the seventh downstream port P7 may not be performed. The lane between the sixth downstream port P6 and the sixth upstream port P6' and the lane between seventh downstream port P7 and the seventh upstream port P7' may both be electrically idle.

In addition, according to the PCIe specifications, the link width may be determined by one of a first lane, a second lane, a fourth lane, an eighth lane, a 12th lane, a 16th lane and a 32nd lane. Therefore, the first PCIe device 700-1 may set a link to have a link width including four lanes Lane 0 to Lane 3, for example. The link may consist of only the four lanes Lane 0 to Lane 3. Although the lane between the fourth downstream port P4 and the fourth upstream port P4' is not a fail lane, this lane may be in electrical idle.

However, the performance of the PCIe device may be lowered because the lane between the fourth downstream port P4 and the fourth upstream port P4', the lane between the sixth downstream port P6 and the upstream port P6' and the lane between the seventh downstream port P7 and the seventh upstream port P7' are unavailable. Accordingly, an operation that excludes a fail lane and a method for forming a link using allowable remaining lanes may be required.

Figure 12:
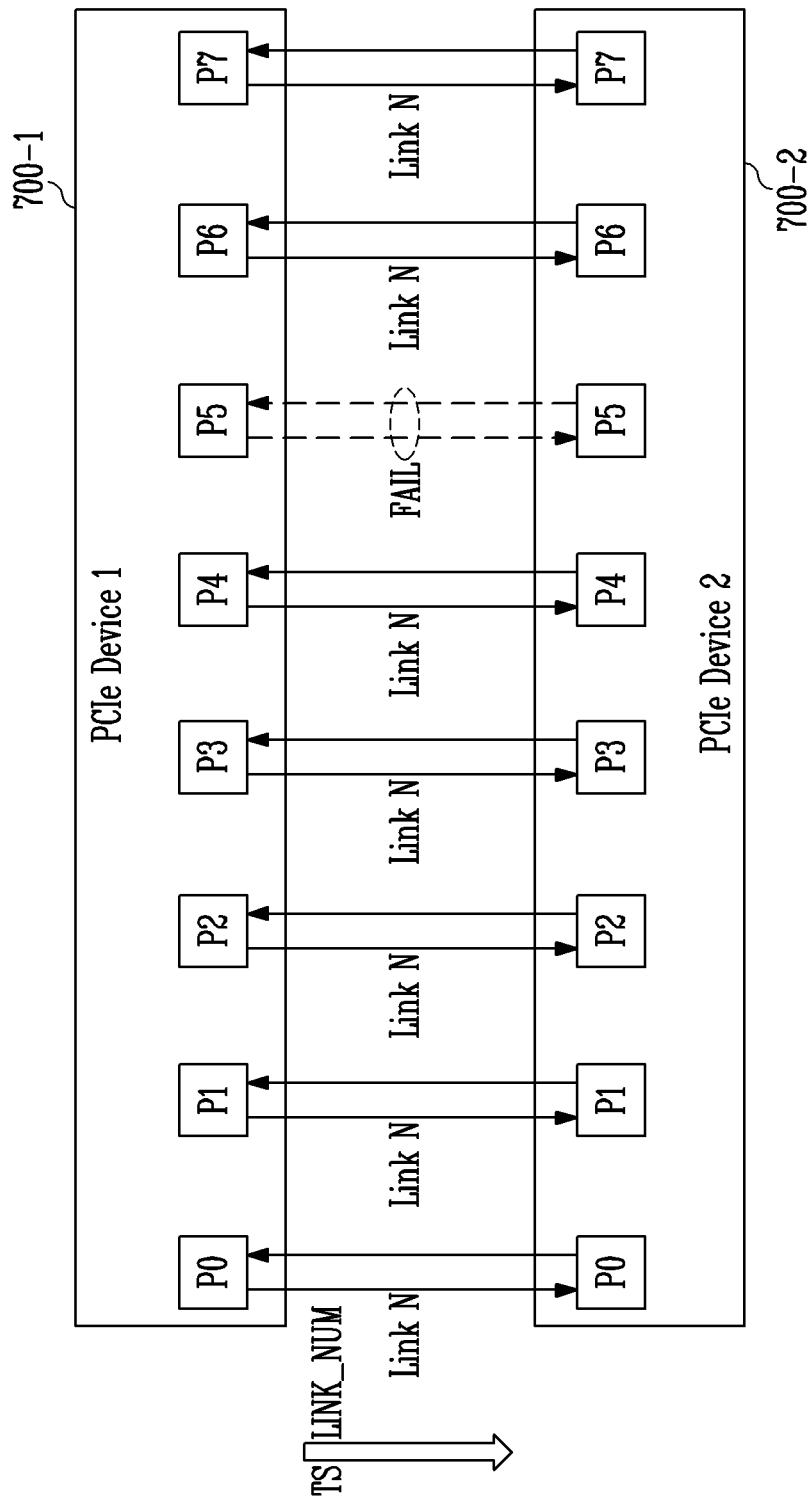
FIG. 12 is a diagram illustrating an operation of determining a link number according to an embodiment of the present disclosure.

FIG. 12 is a diagram illustrating an operation of determining a link number according to an embodiment of the present disclosure.

Referring to FIG. 12, a first PCIe device 700-1 may detect a fail lane through a link setting operation in a detect state or a polling state.

The first PCIe device 700-1 may determine a link number Link_N in a configuration state. The first PCIe device 700-1 may provide upstream ports P0' to P4', P6', and P7' with training sequences ordered sets TS including information LINK_NUM about a link number through the downstream ports P0 to P4, P6, and P7, except a fifth downstream port P5 coupled to a fail lane. A second PCIe device 700-2 may receive the training sequences ordered sets TS through the upstream ports P0' to P4', P6', and P7', and may accept the link number Link_N.

Figure 13:
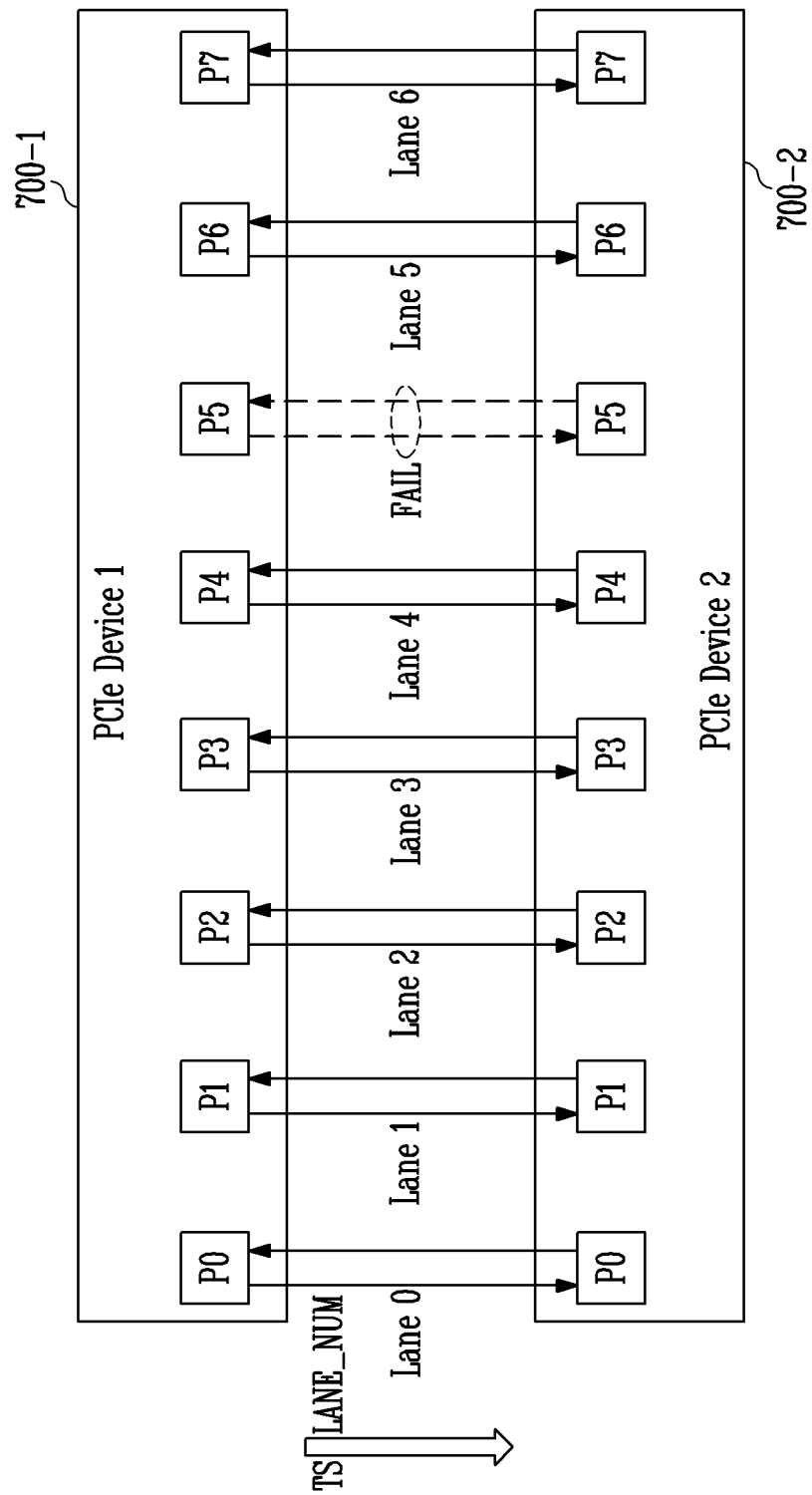
FIG. 13 is a diagram illustrating an operation of determining a lane number according to an embodiment of the present disclosure.

FIG. 13 is a diagram illustrating an operation of determining a lane number according to an embodiment of the present disclosure.

Referring to FIG. 13, a first PCIe device 700-1 may detect a fail lane through a link setting operation in a detect state or a polling state.

The first PCIe device 700-1 may determine a lane number of each of the remaining lanes, except for the fail lane, in the configuration state. The first PCIe device 700-1 may determine the lane number of each of the remaining lanes such that lane numbers of the remaining lanes may ascend or descend in sequential order. For example, the first PCIe device 700-1 may sequentially increase lane numbers from the lane between the zero-th downstream port P0 and the zero-th upstream port P0' to the lane between the seventh downstream port P7 and the seventh upstream port P7', skipping the fail lane. Therefore in this example, the lane between the zero-th downstream port P0 and the zero-th upstream port P0' may be determined as the zero-th lane Lane 0. The lane between the first downstream port P1 and the first upstream port P1' may be determined as the first lane Lane 1. The lane between the second downstream port P2 and the second upstream port P2' may be determined as the second lane Lane 2. The lane between the third downstream port P3 and the third upstream port P3' may be determined as the third lane Lane 3. The lane between the fourth downstream port P4 and the fourth upstream port P4' may be determined as the fourth lane Lane 4. The lane between the sixth downstream port P6 and the sixth upstream port P6' may be determined as the fifth lane Lane 5. The lane between the seventh downstream port P7 and the seventh upstream port P7' may be determined as the sixth lane Lane 6. For convenience of explanation, FIG. 13 illustrates lane numbers of the remaining lanes increasing sequentially. However, an operation to determine the lane numbers of the remaining lanes that decreases sequentially may also be utilized.

In addition, the first PCIe device 700-1 may provide the upstream ports P0' to P4', P6', and P7' with the training sequences ordered sets TS, including information LANE_NUM about a lane number, through the downstream ports P0 to P4, P6, and P7, except the fifth downstream port P5 coupled to a fail lane. For example, the zero-th downstream port P0 may provide the zero-th upstream port P0' with information about the zero-th lane Lane 0 through the training sequences ordered sets TS. The first downstream port P1 may provide the first upstream port P1' with information about the first lane Lane 1 through the training sequences ordered sets TS. The second downstream port P2 may provide the second upstream port P2' with information about the second lane Lane 2 through the training sequences ordered sets TS. The third downstream port P3 may provide the third upstream port P3' with information about the third lane Lane 3 through the training sequences ordered sets TS. The fourth downstream port P4 may provide the fourth upstream port P4' with information about the fourth lane Lane 4 through the training sequences ordered sets TS. The sixth downstream port P6 may provide the sixth upstream port P6' with information about the fifth lane Lane 5 through the training sequences ordered sets TS. The seventh downstream port P7 may provide the seventh upstream port P7' with information about the sixth lane Lane 6 through the training sequences ordered sets TS.

The second PCIe device 700-2 may receive the training sequences ordered sets TS through the upstream ports P0' to P4', P6', and P7' and accept the lane numbers Lane 0 to Lane 6.

Therefore, according to an embodiment, by setting a link to have a link width including the remaining lanes except for a fail lane, a link may be formed using an activated operation or allowable lanes. According to another embodiment, a link may be formed using an operation on some of allowable lanes instead of an operation on all allowable lanes. For example, the second PCIe device 700-2 may accept the lane numbers Lane 0 to Lane 5 using an operation on six allowable lanes among the seven allowable lanes Lane 0 to Lane 6.

Figure 14:
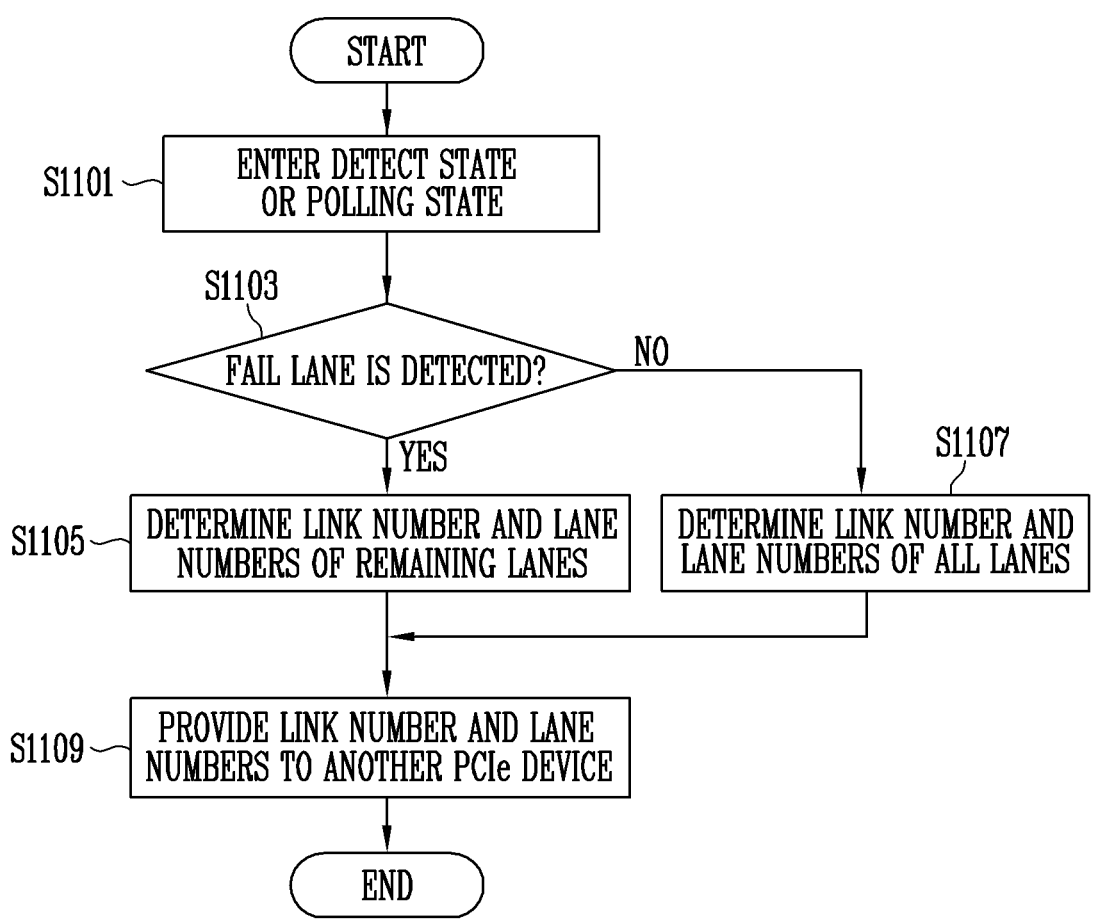
FIG. 14 is a diagram illustrating a method of operating a PCIe device according to an embodiment of the present disclosure.

FIG. 14 is a diagram illustrating a method of operating a PCIe device according to an embodiment of the present disclosure.

The method of FIG. 14 may be performed by a PCIe device 700 as shown in FIG. 7.

Referring to FIG. 14, at step S1101, the PCIe device 700 may enter a detect state or a polling state during a link setting operation.

At step S1103, the PCIe device 700 may determine whether a fail lane from among a plurality of lanes is detected. For example, when a link is in the detect state, the PCIe device 700 may detect the fail lane by a link setting operation corresponding to the detect state. In addition, when the link is in the polling state, the PCIe device 700 may detect the fail lane by the link setting operation corresponding to the polling state.

When the fail lane is detected as a result of determination at step S1103, the PCIe device 700 may determine a link number and a lane number of each of the remaining lanes at step S1105. For example, the PCIe device 700 may determine the lane number of each of the remaining lanes such that lane numbers of the remaining lanes may increase or decrease sequentially in the configuration state.

When the fail lane is not detected as the result of determination at step S1103, the PCIe device 700 may determine a link number and lane numbers of all lanes at step S1107.

At step S1109, the PCIe device 700 may provide the determined link number and the determined lane numbers to another PCIe device. Another PCIe device may accept the determined link number and the determined lane numbers.

According to the present disclosure, a PCIe device capable of setting, when a fail lane is detected during a link setting operation, a link using the remaining lanes, and a computing system including the PCIe device may be provided.

In addition, according to the present disclosure, when a fail lane is detected during a link setting operation, performance of a PCIe device may be improved by configuring the remaining lanes as logically continuous lanes.

In the above-discussed embodiments, all steps may be selectively performed or skipped. In addition, the steps in each embodiment may not always be performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure. It will be apparent to those skilled in the art that various modifications can be made to the above-described exemplary embodiments of the present disclosure without departing from the spirit or scope of the invention. Thus, it is intended that the present disclosure cover all such modifications provided they come within the scope of the appended claims and their equivalents.

A preferred PCIe device and a method of operating the same, in which a fail lane is detected during a link setting operation and the PCIe device establishes a link using remaining lanes is disclosed in U.S. patent application Ser. No. 17/506,889, filed Oct. 21, 2021 and entitled, "PERIPHERAL COMPONENT INTERCONNECT EXPRESS DEVICE AND COMPUTING SYSTEM INCLUDING THE SAME", the entire disclosure of which is incorporated herein by reference.

Figure 15:
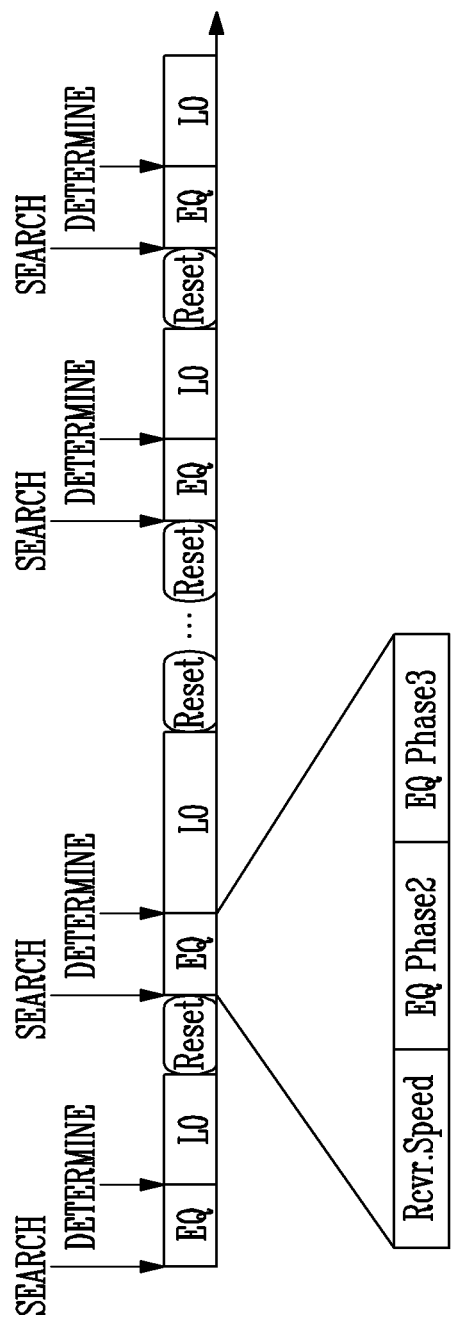
FIG. 15 is a diagram illustrating a method of operating a PCIe interface performing an equalization operation according to the related art.

FIG. 15 is a diagram illustrating a method of operating a PCIe interface performing an equalization operation in the related art.

FIG. 15 shows an equalization operation performed over time. As described above with reference to FIGS. 8 and 9, the link status of the upstream port and the downstream port in the equalization operation may include the Rcvr.Speed state, the EQ Phase2 state, and the EQ Phase3 state. In addition, the Rcvr.Speed state may be unstable since the data rate has been changed. Thus, the reliability of the equalization operation in the Rcvr.Speed state may be deteriorated. In addition, in the EQ Phase2 state, the upstream port may determine a TX coefficient of the downstream port for a duration of up to 24 ms. More specifically, the upstream port may be a PCIe endpoint that is coupled to a PCIe computing system. From the viewpoint of the PCIe endpoint, physical characteristics including a channel length may vary from a platform to a platform being connected, or from a slot to a slot. In addition, the equalization operation may go through a process of searching for an appropriate Equalization operation and a process of determining the EQ coefficient. Even if an optimal EQ coefficient is determined, if the link is reset (e.g., hot rest, cold reset, or warm reset), an EQ coefficient may be searched for and determined again. In other words, an equalization operation which is performed every time may be performed discontinuously from a previously performed equalization operation. Therefore, even if a link up to the previous EQ coefficient is performed, an optimal EQ coefficient may not be ensured in subsequent equalization operations. The EQ coefficient may include a TX coefficient and an RX coefficient.

In the EQ Phase3 state, the TX coefficient of the PCIe endpoint connected in the PCIe computing system may be set.

Since the PCIe computing system knows the physical characteristics, including channel characteristics, of the PCIe computing system, the equalization operation in the Phase3 state may not matter.

Figure 16:
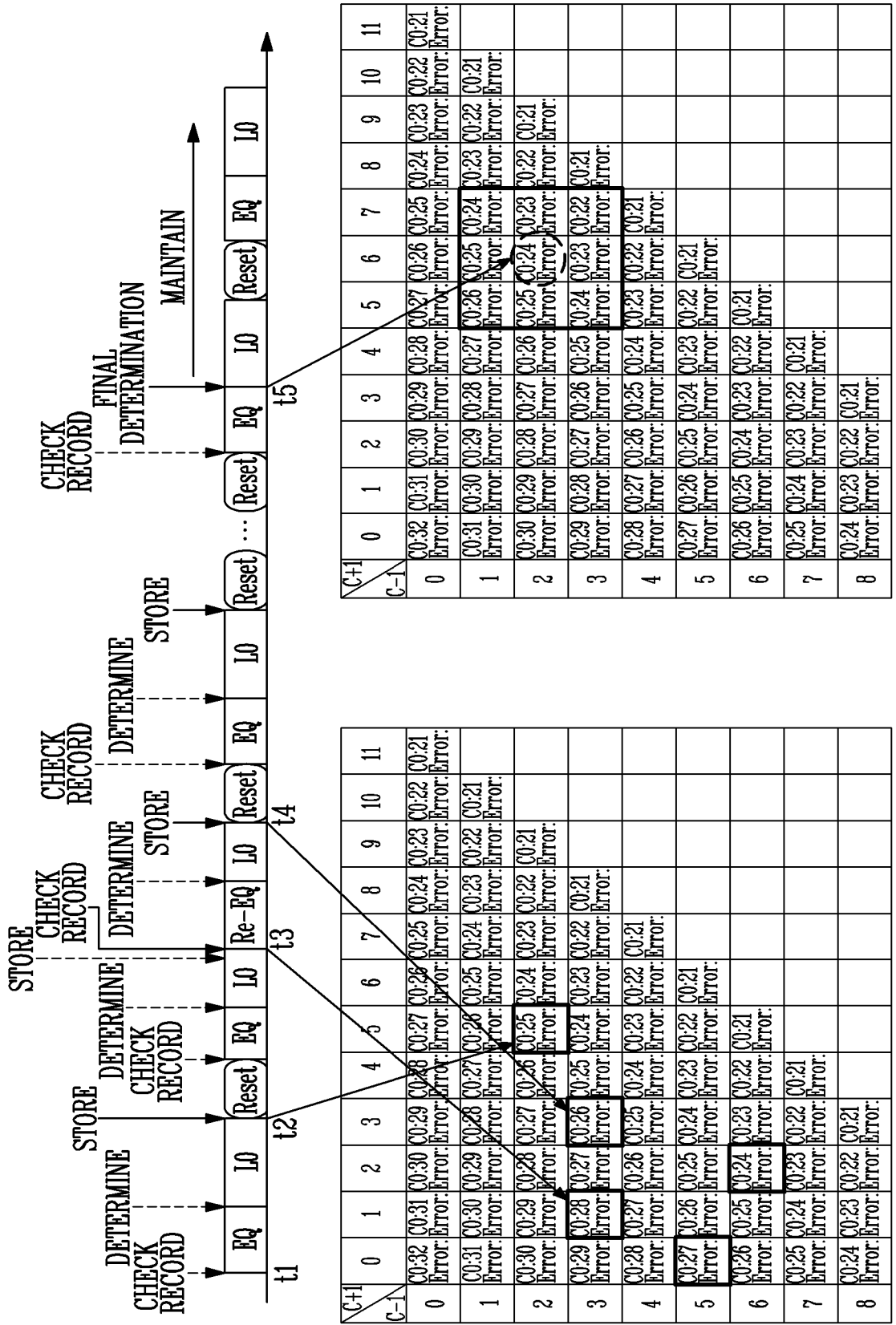
FIG. 16 is a diagram illustrating a method of operating a PCIe interface performing an equalization operation according to an embodiment of the present disclosure.

FIG. 16 is a diagram illustrating a method of operating a PCIe interface performing an equalization operation according to an embodiment of the present disclosure.

FIG. 16 shows an equalization operation performed over time. A PCIe interface may store error information corresponding to each of a plurality of lanes and EQ coefficients in an EQ coefficient table. When it is assumed that an equalization operation is performed for the first time at a first time t1, the error information corresponding to each of the plurality of lanes and EQ coefficients may not be stored in the EQ coefficient table at the first time t1. In addition, at a second time t2, information about an error occurring in an L0 state or a link up state, or information about an error occurring during the equalization operation may be stored in the EQ coefficient table. Similarly, to the second time t2, the error information may be stored at a third time t3 and a fourth time t4.

The PCIe interface may identify optimal EQ coefficient information as the equalization operation is repeated. More specifically, the PCIe interface may determine the final optimal EQ coefficient on the basis of log information indicating the number of times the equalization operation is attempted and the error information about the errors occurring in the L0 state or the link up state according to each lane and EQ coefficient. The PCIe interface may determine an efficient, final EQ coefficient by performing equalization by using an EQ coefficient adjacent to an EQ coefficient that includes the lowest error information in the EQ coefficient table. According to an embodiment of the present disclosure, the PCIe interface may determine the final EQ coefficient and maintain the determined final EQ coefficient even when a link reset is performed.

FIG. 17 is a diagram illustrating an EQ coefficient table according to an embodiment of the present disclosure.

FIG. 17 shows an EQ coefficient table arranged according to EQ coefficients. The EQ coefficient table may include values with respect to a pre-cursor, a cursor, and a post-cursor. More specifically, the EQ coefficient may consist of a combination of a pre-cursor, a cursor, and a post-cursor. The EQ coefficient table may include values with respect to the pre-cursor, the cursor, and the post-cursor that satisfy [Equation 1], [Equation 2] and [Equation 3]. FIG. 17 is a diagram showing an example in which a full swing (FS) value is 32 and a low frequency (LF) is 10. However, the FS value and the LF value may be changed at the time of implementation.

The EQ coefficient table may store error information according to each of the plurality of lanes coupled to the PCIe system device. More specifically, the EQ coefficient table may accumulate and store errors occurring in the L0 state or the link up state. The errors may include at least one of a training sequence error, an ordered set (OS) error, a receiver (RX) error, a decoding error, a sync-header error, and a framing error. In addition, the EQ coefficient table may store margin information indicating a lane margin calculated according to each of the plurality of lanes. More specifically, a margin with respect to a height and a width of the receiver Rx may be stored. According to an embodiment, the PCIe system device may record the margin of the receiver Rx through an error sampler.

According to an embodiment, the EQ coefficient table may efficiently determine the final EQ coefficient by using the stored error information. More specifically, the PCIe device may understand information about errors occurring in the L0 state or the link up state according to each EQ coefficient by using the error information. In addition, the PCIe device may determine the efficient final EQ coefficient by performing equalization by using an EQ coefficient adjacent to an EQ coefficient that includes the lowest error information in the EQ coefficient table.

Figure 18:
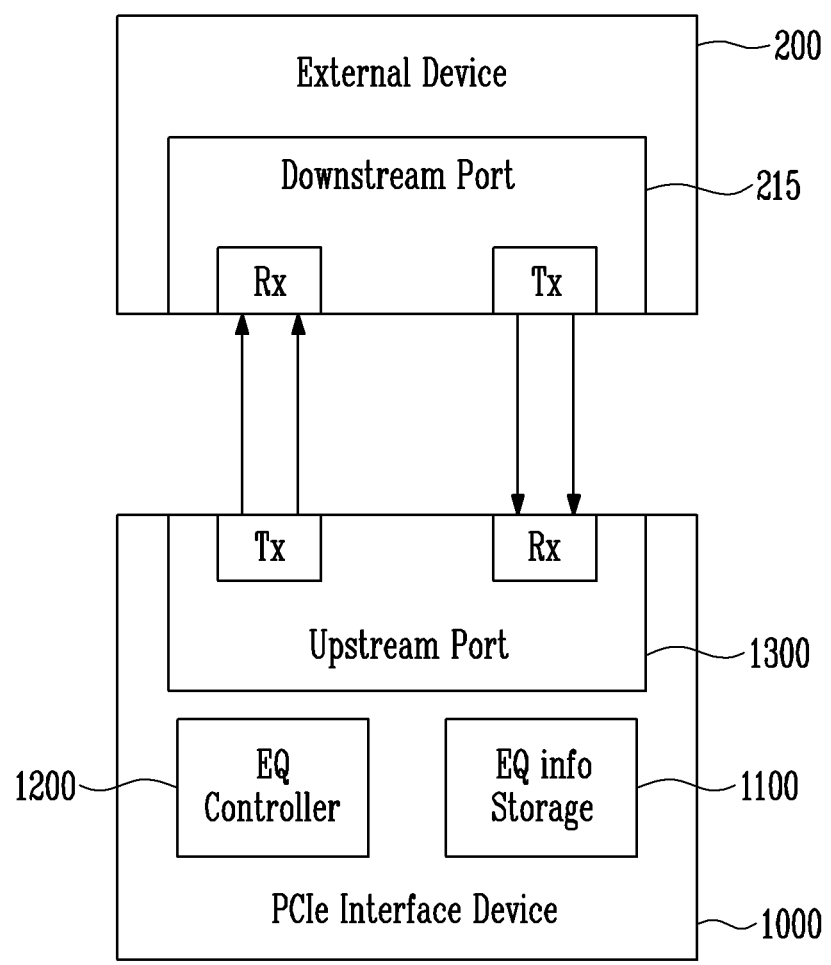
FIG. 18 is a diagram illustrating the configuration of a PCIe interface according to an embodiment of the present disclosure.

FIG. 18 is a diagram illustrating the configuration of a PCIe interface according to an embodiment of the present disclosure.

FIG. 18 illustrates a PCIe interface device 1000 and an external device 200. For example, the external device 200 may be one of the root complex 120, the switch 140, the PCIe endpoints 150_1 to 150_3, the legacy endpoints 160_1 and 160_2, and the PCIe to PCI/PCI-X bridge 170 as shown in FIG. 1. The external device 200 and the PCIe interface device 1000 may perform communication using a PCIe interface supporting a PCIe protocol. More specifically, the external device 200 and the PCIe interface device 1000 may form a link and perform communication through the formed link. For example, the external device 200 and the PCIe interface device 1000 may transmit and receive packets through the link. The link may include a plurality of lanes.

The PCIe interface device 1000 may include an EQ information storage 1100, an EQ controller 1200, and an upstream port 1300.

The EQ information storage 1100 may include log information and error information. The log information may indicate the number of times an equalization operation with respect to each of EQ coefficients including a transmitter coefficient or a receiver coefficient is attempted. According to an embodiment, the EQ information storage 1100 may store the error information about an error that occurs in each of the plurality of lanes. The error may include at least one of a training sequence error, an ordered set (OS) error, a receiver (RX) error, a decoding error, a sync-header error, and a framing error.

According to an embodiment, the EQ information storage 1100 may be realized as a non-volatile memory device that stores the log information or the error information in the event of a link reset (e.g., cold reset, warm reset or hot reset). In addition, according to an embodiment, the EQ information storage 1100 may store preset combinations that are set beforehand among the EQ coefficients.

According to an embodiment, the EQ information storage 1100 may store margin information that indicates a lane margin that is calculated according to each of the plurality of lanes. According to an embodiment, the EQ information storage 1100 may store port information that includes a Full Swing (FS) value or a Low Frequency (LF) value.

The EQ controller 1200 may control the general operations of the PCIe interface device 1000 to perform an equalization operation that determines the transmitter or receiver settings of each of the plurality of lanes. According to an embodiment, the EQ controller 1200 may determine the final EQ coefficient based on the log information and the error information. According to an embodiment, the EQ controller 1200 may determine one of the coefficients when the number of attempts of the equalization operation with respect to the preset combinations set beforehand exceeds a first threshold number, among the EQ coefficients, as the final EQ coefficient. According to an embodiment, the EQ controller 1200 may determine the final EQ coefficient based on the error information when the number of attempts of the equalization operation with respect to the preset combinations set beforehand exceeds a second threshold number. According to an embodiment, when the number of attempts of an equalization operation corresponding to each of the three EQ coefficients with fewest errors occurring in a unit time in the L0 state exceeds a third threshold number, the EQ controller 1200 may determine one of the three EQ coefficients as the final EQ coefficient.

According to an embodiment, when the link coupled to the PCIe interface device is reset, the EQ controller 1200 may determine whether an equalization operation with respect to an external device has been performed before the link is reset on the basis of the port information including the FS value or the LF value. According to an embodiment, when the number of errors occurring in the unit time in the L0 state exceeds a threshold error value, the EQ controller 1200 may control the PCIe interface device to perform a re-equalization operation for resetting the transmitter or receiver settings of each of the plurality of lanes.

Figure 19:
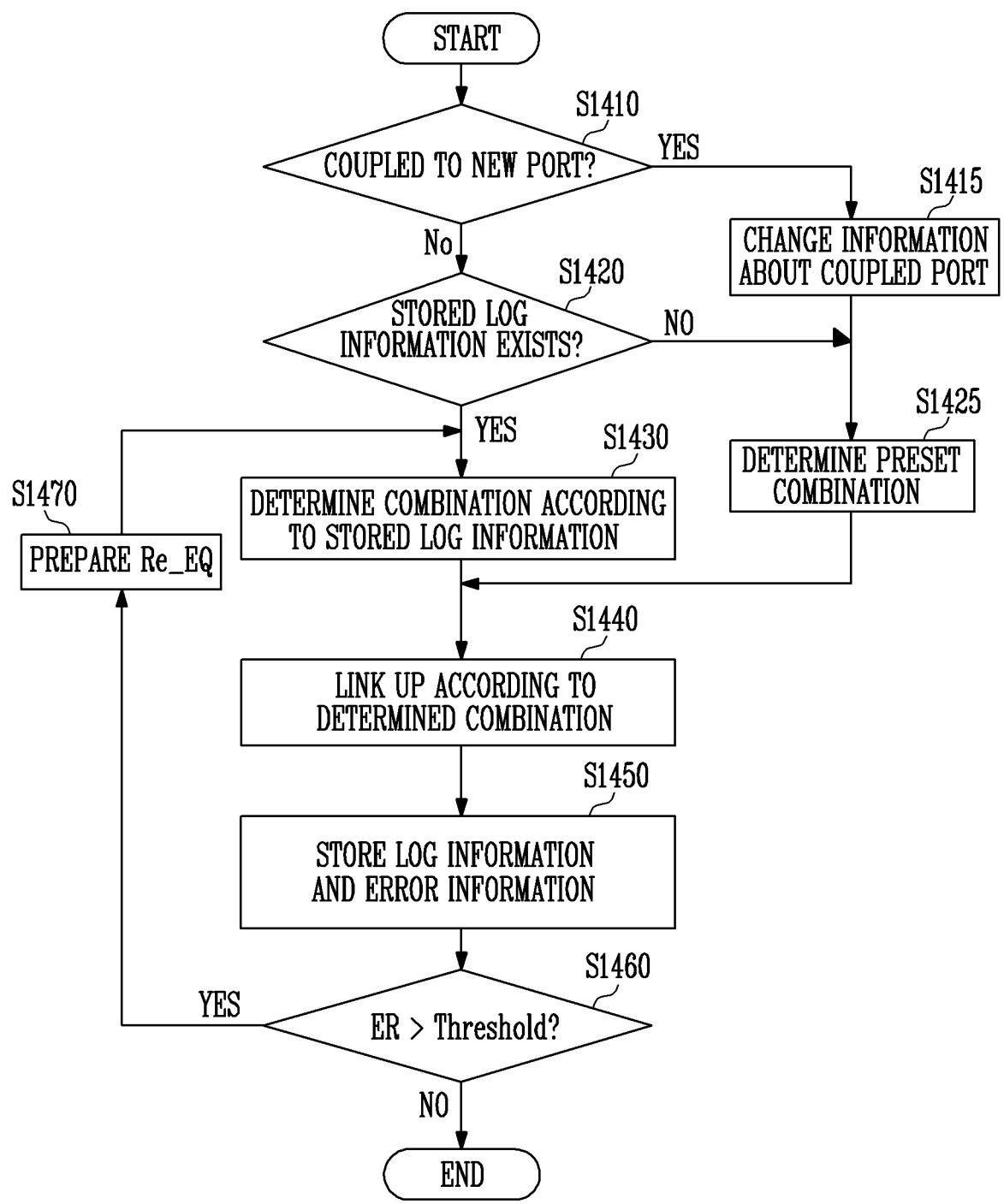
FIG. 19 is a diagram illustrating a method of operating a PCIe interface according to an embodiment of the present disclosure.

FIG. 19 is a diagram illustrating a method of operating a PCIe interface according to an embodiment of the present disclosure.

In FIG. 19, a method of operating a PCIe interface is sequentially illustrated. More specifically, the PCIe interface may be coupled to an external device through a link that includes a plurality of lanes. In addition, the PCIe interface may perform an equalization operation to determine transmitter or receiver settings of each of the plurality of lanes. The PCIe interface may determine whether a physically coupled link is connected to a new port when entering the equalization operation at step S1410. In other words, it may be determined whether the equalization operation has been previously performed on the external device coupled to the PCIe interface. The PCIe interface may determine whether the external device is a new port that is coupled first to the PCIe interface on the basis of port information that includes a Config read/write address order, a Full Swing (FS) value, a Low Frequency (LF) value, existence of a retimer(s), the number of retimers, and a bus number.

In addition, when the external device is the new port that is coupled first to the PCIe interface (YES at step S1410), information about the port coupled to the PCIe interface may be changed at step S1415. More specifically, the PCIe interface may manage log information or an error rate (ER) on the basis of the port information. According to an embodiment, when the external device coupled to the PCIe interface is determined as the new port, the existing logged port information may be deleted.

In addition, when the external device is not the new port coupled to the PCIe interface (NO at step S1410), the PCIe interface may determine whether log information is stored or not on the basis of the port information at step S1420. In addition, the log information may indicate the number of times an equalization operation is tested on a plurality of lanes with respect to each of the EQ coefficients.

When there is no log information stored in the PCIe interface (NO at step S1420), the PCIe interface may determine an EQ coefficient as a preset combination at step S1425. The EQ coefficient may consist of a combination of a pre-cursor, a cursor and a post-cursor. In addition, the PCIe interface may perform a link up according to the preset combination at step S1440.

When the log information is stored in the PCIe interface (YES at step S1420), the PCIe interface may determine an EQ coefficient or a combination to test an equalization operation on the basis of the log information stored in the PCIe interface at step S1430. The method of determining the EQ coefficient or combination is described below in detail with reference to FIG. 15.

In addition, the PCIe interface may perform the link up according to the determined EQ coefficient or combination at step S1440. The PCIe interface may store log information that corresponds to the determined EQ coefficient and information about errors occurring in the link up state at step S1450. The errors may include at least one of a training sequence error, an ordered set (OS) error, a receiver (RX) error, a decoding error, a sync-header error, and a framing error. In addition, the PCIe interface may store error information about errors occurring in each of the plurality of lanes.

According to an embodiment, the PCIe interface may store margin information indicating a lane margin calculated according to each of the plurality of lanes. According to an embodiment, the PCIe interface may determine the final EQ coefficient based on the log information and the error information. According to an embodiment, the PCIe interface may determine one of the coefficients when the number of tests of the equalization operation with respect to the preset combinations set beforehand exceeds a first threshold number, among the EQ coefficient, as the final EQ coefficient. The first threshold number may be 10 (ten) and be appropriately calculated through repetitive experiments. According to an embodiment, the PCIe interface may determine the final EQ coefficient based on the error information when the number of tests of the equalization operation with respect to all EQ coefficients exceeds a second threshold number. The second threshold number may be 10 (ten) and be appropriately calculated through repetitive experiments. According to an embodiment, when the number of tests of an equalization operation corresponding to each of the three EQ coefficients with fewest errors occurring in a unit time in the link up state exceeds a third threshold number, the PCIe interface may determine one of the three EQ coefficients as the final EQ coefficient. The third threshold number may 20 (twenty) to 30 (thirty) and be appropriately calculated through repetitive experiments.

The PCIe interface may determine whether the number of errors occurring in the unit of time in the link up state exceeds a threshold error value at step S1460. In addition, when the number of errors occurring in the unit of time exceeds the threshold error value (YES at step S1460), a re-equalization operation for resetting an EQ coefficient may be performed at step S1470.

Figure 20:
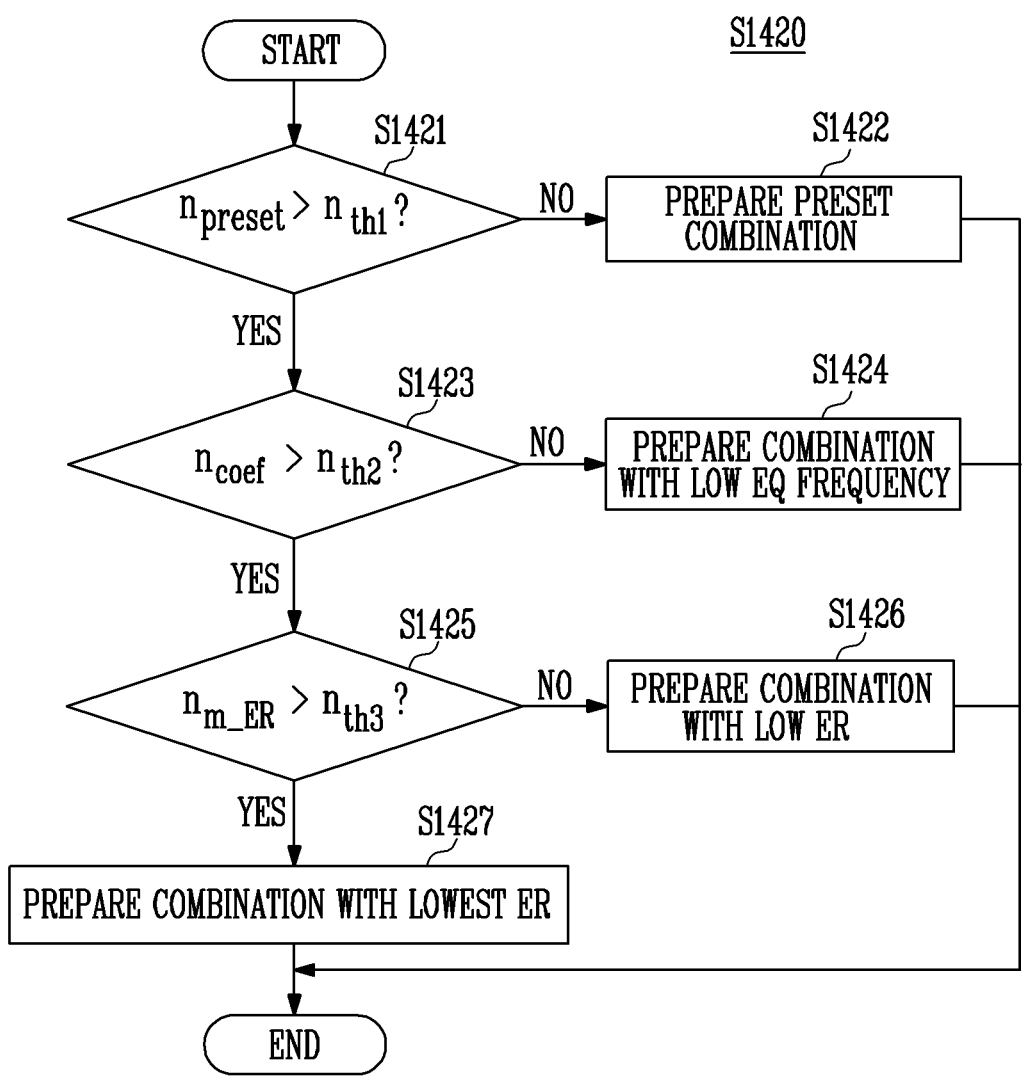
FIG. 20 is a diagram illustrating how an EQ coefficient is determined based on stored log information according to an embodiment of the present disclosure.

FIG. 20 is a diagram illustrating how an EQ coefficient is determined based on stored log information according to an embodiment of the present disclosure.

Referring to FIG. 20, when the log information is stored in the PCIe interface (YES at step S1420 of FIG. 19), the PCIe interface may determine an EQ coefficient or a combination to test an equalization operation on the basis of the log information stored in the PCIe interface.

More specifically, when the log information is stored in the PCIe interface, the PCIe interface may determine whether a number $n_{preset}$ of attempts of an equalization operation on preset combinations set beforehand, among EQ coefficients or combinations, exceeds a first threshold number $n_{th1}$ at step S1421.

In addition, when the number of attempts of the equalization operation on the preset combinations set beforehand does not exceed the first threshold number at step S1421-NO), the PCIe interface may determine a preset combination among the EQ coefficients as a combination for attempting an equalization operation at step S1422.

Furthermore, when the number of attempts of the equalization operation on the preset combinations set beforehand exceeds the first threshold number (YES at step S1421), the PCIe interface may determine whether the number $n_{coef}$ of attempts of equalization operations with respect to all EQ coefficients exceeds a second threshold number $n_{th2}$ at step S1423.

When the number $n_{coef}$ of attempts of the equalization operations with respect to all EQ coefficients does not exceed the second threshold number $n_{th2}$ (NO at step S1423), the PCIe interface may prepare or determine combinations with a lower number of attempts of equalization operations or a low frequency, among all EQ coefficients, as an EQ coefficient for performing an equalization operation at step S1424.

In addition, when the number $n_{coef}$ of attempts of the equalization operations with respect to all EQ coefficients does exceed the second threshold number $n_{th2}$ at step (YES at step S1423), the PCIe interface may determine whether the number $n_{m\_ER}$ of attempts of an equalization operation on each of the three EQ coefficients with lowest error rates exceeds a third threshold number $n_{th3}$ at step S1425.

When the number $n_{m\_ER}$ of attempts of the equalization operation on each of the three EQ coefficients with the lowest error rates does not exceed the third threshold number $n_{th3}$ (NO at step S1425), the PCIe interface may prepare a combination to perform an equalization operation with respect to EQ coefficients and combinations including the three EQ coefficients with the lowest error rates at step S1426.

On the other hand, when the number $n_{m\_ER}$ of attempts of the equalization operation on each of the three EQ coefficients with the lowest error rates exceeds the third threshold number $n_{th3}$ (YES at step S1425), the PCIe interface may prepare one EQ coefficient with the lowest error rate as a combination to perform an equalization operation at step S1427.

According to an embodiment, the PCIe interface may determine the optimal EQ coefficient that satisfies all steps S1421, S1423 and S1425 as the final EQ coefficient.

According to the present disclosure, a PCIe interface of performing an improved PCIe equalization operation and an operating method thereof may be provided.

In the above-discussed embodiments, all steps may be selectively performed or skipped. In addition, the steps in each embodiment may not always be performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure. It will be apparent to those skilled in the art that various modifications can be made to the above-described exemplary embodiments of the present disclosure without departing from the spirit or scope of the invention. Thus, it is intended that the present disclosure cover all such modifications provided they come within the scope of the appended claims and their equivalents.

A preferred PCIe device and a method of operating the same, which is capable of performing an improved PCIe equalization operation and an operating method thereof is disclosed in U.S. patent application Ser. No. 17/506,953, filed Oct. 21, 2021 and entitled, "PERIPHERAL COMPONENT INTERCONNECT EXPRESS INTERFACE DEVICE AND OPERATING METHOD THEREOF", the entire disclosure of which is incorporated herein by reference.

What is claimed is:

1. A Peripheral Component Interconnect Express (PCIe) device, comprising:
    a plurality of lanes comprising a plurality of ports;
    a link controller setting a link including the plurality of lanes, wherein the link is set to have a link width that includes remaining lanes, except for a fail lane from among the plurality of lanes,
    an EQ controller performing an equalization operation for determining a transmitter or receiver setting of each of the remaining lanes; and
    an EQ information storage storing log information indicating a number of equalization operation attempts with respect to each of a plurality of EQ coefficients and storing error information about an error occurring in an L0 state with respect to each of the plurality of EQ coefficients, which includes a transmitter coefficient or a receiver coefficient,
    wherein the EQ controller determines a final EQ coefficient using the log information and the error information.

2. The PCIe device of claim 1, wherein the fail lane from among the plurality of lanes has a state in which the fail lane is unable to form a link with the remaining lanes that have not failed from among the plurality of lanes.

3. The PCIe device of claim 1, wherein the link controller includes a Link Training and Status State Machine (LTSSM) setting the link.

4. The PCIe device of claim 1, wherein when the link is in a detect state, the link controller detects the fail lane by a link setting operation corresponding to the detect state and performs the link setting operation corresponding to the detect state on the remaining lanes.

5. The PCIe device of claim 1, wherein when the link is in a polling state, the link controller detects the fail lane by a link setting operation corresponding to the polling state and performs the link setting operation corresponding to the polling state on the remaining lanes.

6. The PCIe device of claim 1, wherein when the link is in a configuration state, the link controller performs a link setting operation corresponding to the configuration state on the remaining lanes.

7. The PCIe device of claim 6, wherein the link controller determines a link number of the link and lane numbers of the remaining lanes, respectively, in the configuration state.

8. The PCIe device of claim 7, wherein the link controller determines the lane numbers of the remaining lanes by a lane number negotiation operation.

9. The PCIe device of claim 7, wherein the link controller determines the lane numbers of the remaining lanes so that the lane numbers increase or decrease sequentially.

10. The PCIe device of claim 7, wherein the plurality of lanes comprises a plurality of other ports and the link controller provides the plurality of other ports with the link number and the lane numbers of the remaining lanes through the plurality of ports.

11. The PCIe device of claim 10, wherein the link controller provides the link number and the lane numbers of the remaining lanes to the plurality of other ports by using training sequences ordered sets.

12. The PCIe device of claim 1, wherein the error includes at least one of a training sequence error, an ordered set (OS) error, a receiver (RX) error, a decoding error, a sync-header error, and a framing error.

13. The PCIe device of claim 12, wherein the EQ information storage stores the error information about an error occurring in each of the plurality of lanes.

14. The PCIe device of claim 1, wherein the EQ information storage stores margin information indicating a lane margin calculated for each of the plurality of lanes.

15. The PCIe device of claim 1, wherein each of the plurality of EQ coefficients includes a combination of a pre-cursor, a cursor and a post-cursor.

16. The PCIe device of claim 1, wherein the EQ controller determines the final EQ coefficient using the log information when the number of equalization operation attempts with respect to preset combinations exceeds a first threshold number for the plurality of EQ coefficients.

17. The PCIe device of claim 1, wherein the EQ controller determines the final EQ coefficient using the error information when the number of equalization operation attempts with respect to the plurality of EQ coefficients exceeds a second threshold number.

18. The PCIe device of claim 1, wherein the EQ controller determines one of three EQ coefficients, from among the plurality of EQ coefficients having the fewest errors occurring in a unit time in the L0 state, as the final EQ coefficient when the number of equalization operation attempts corresponding to each of the three EQ coefficients exceeds a third threshold number.

19. The PCIe device of claim 1, wherein when the link coupled to the PCIe device is reset, the EQ controller determines whether the equalization operation on an external device is performed before the link is reset using port information including a full swing (FS) value or a low frequency (LF) value.

20. The PCIe device of claim 1, wherein the EQ controller controls the PCIe device to perform a re-equalization operation for resetting the transmitter or receiver setting of each of the plurality of lanes when a number of errors occurring in a unit time in the L0 state exceeds a threshold error value.

* * * * *